(12) United States Patent
Shin et al.

(10) Patent No.: US 6,674,439 B1
(45) Date of Patent: Jan. 6, 2004

(54) INFORMATION TERMINAL DEVICE

(75) Inventors: Hidehiko Shin, Moriguchi (JP); Hiromi Wada, Neyagawa (JP); Naoya Yoshida, Kyotanabe (JP); Atsunobu Kato, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/566,810

(22) Filed: May 8, 2000

(30) Foreign Application Priority Data

May 13, 1999 (JP) .............................. 11-132251

(51) Int. Cl.[7] .............................. G06T 1/00; G06F 15/00
(52) U.S. Cl. .............................. 345/501; 345/530
(58) Field of Search .............................. 345/530, 501, 345/520, 667; 725/114; 709/217–219

(56) References Cited

U.S. PATENT DOCUMENTS

| 5,615,384 A | 3/1997 | Allard et al. | |
| 5,819,302 A | 10/1998 | Nielsen | |
| 6,052,715 A | * 4/2000 | Fukui et al. | 725/114 |

FOREIGN PATENT DOCUMENTS

| EP | 0 812 095 A2 | 12/1997 |
| EP | 0 895 187 A2 | 2/1999 |
| EP | 0 989 045 | 2/2000 |
| JP | 2-001065 | 1/1990 |
| JP | 2-001068 | 1/1990 |
| JP | 9-116728 | 5/1997 |
| JP | 10-326244 | 12/1998 |
| JP | 11-149480 | 6/1999 |
| JP | 11-250009 | 9/1999 |
| JP | 2000-56895 | 2/2000 |
| JP | 2000-081867 | 3/2000 |

OTHER PUBLICATIONS

Shimada T. et al.: "Interactive Scaling Control Mechanism for World–Wide Web Systems", Computer Networks and ISDN Systems, NL, North Holland Publishing, Amsterdam, vol. 29, No. 8–13, Sep. 1, 1997, pp. 1467–1477, XP004095341, ISSN: 0169–7552, p. 1467, left–hand column, line 1—p. 1473, right–hand column, paragraph 1; Figures 1–3.

"Method for Performing Zoom" IBM Technical Disclosure Bulletin, US, IBM Corp. New York, vol. 37, No. 1, 1994, p. 11, XP000428685, ISSN: 0018–8689, the whole document.

Kiyoto Tanaka et al., "ISDN Audio–Graphics Teleconferencing Systems", Journal of Electronic Imaging, US, SPIE + IS&T, vol. 2, No. 4, Oct. 1, 1993, pp. 285–295, XP000414335, ISSN: 1017–9909, abstract; Figures 4, 12, p. 285, left–hand column, line 1—p. 289, right–hand column, paragraph 1.

Shimada T. et al.; "Interactive scaling control mechanism for World–Wide Web systems " Computer Networks and ISDN Systems, vol. 29, No. 8–13, Sep. 1, 1997.

"Method Form Performing Zoom" IBM Technical Disclosure Bulletin, vol. 37, No. 1, 1994.

Kiyoto Tanaka et al.; "ISDN Audio–Graphhics Teleconferencing Systems" Journal of Electronic Imaging, vol. 2, No. 4, Oct. 1, 1993.

* cited by examiner

*Primary Examiner*—Kee M. Tung
(74) *Attorney, Agent, or Firm*—Wenderoth, Lind & Ponack, L.L.P.

(57) ABSTRACT

A mobile terminal is provided which can obtain an image from a server and change the size of the image so as to use the image as a background image. An image obtaining unit obtains an image from a server. An over-size decision unit decides whether the entirety of the image obtained by the image obtaining unit can be displayed within the display area in a screen. When the over-size decision unit provides a negative decision, an image resizing unit changes the size of the image obtained by the image obtaining unit so that it can be displayed within the display area in the screen.

4 Claims, 18 Drawing Sheets

F I G. 2
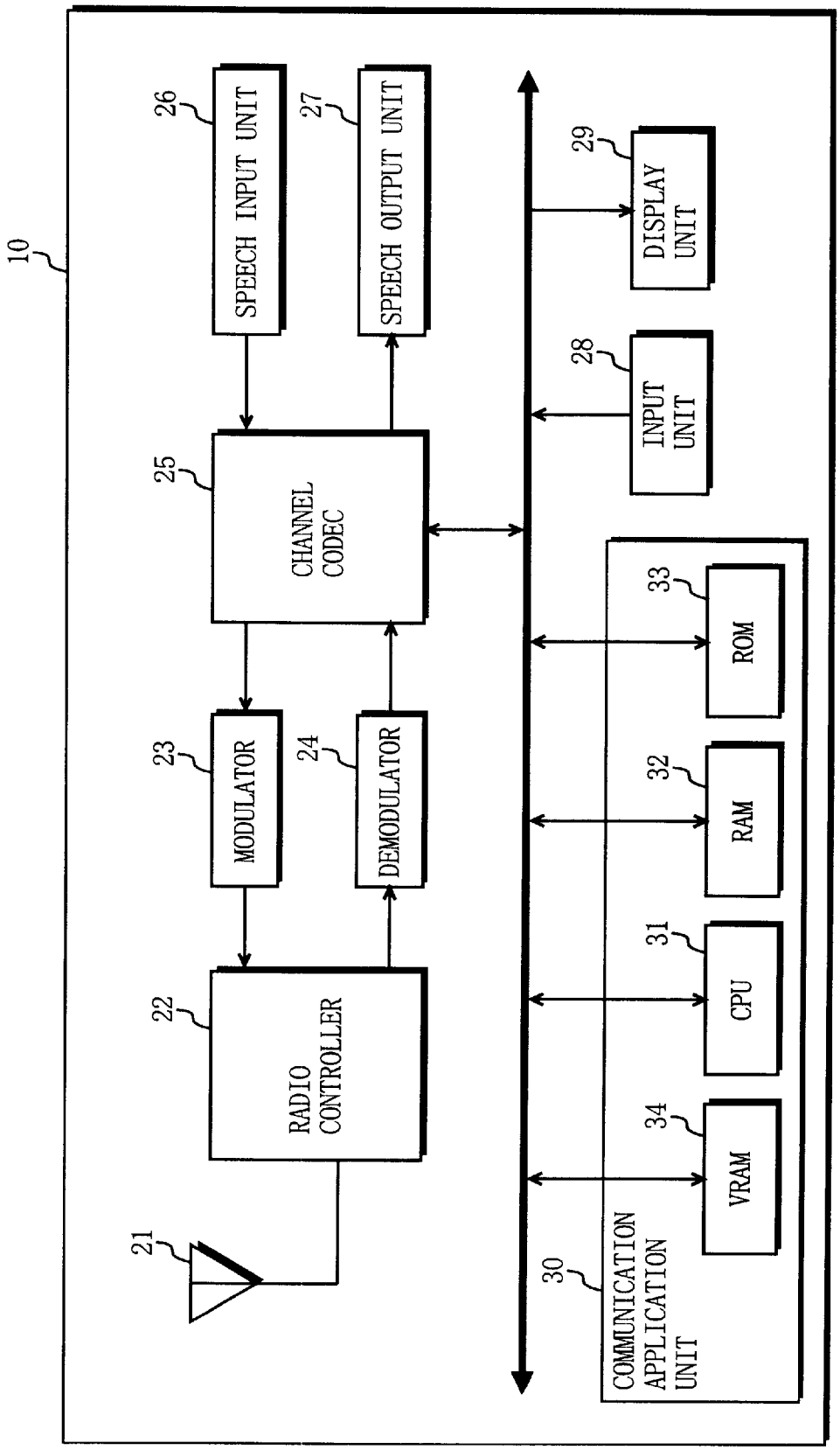

FIG. 13

```
1301    <HTML>
1302    INFORMATION ABOUT CELESTIAL OBJECTS
1303    <A href = "moon.html" > INFORMATION ABOUT THE MOON</A>
1304    <IMG src = "moon.gif" >
1305    <A href = "sun.html" > INFORMATION ABOUT THE SUN</A>
1306    <IMG src = "sun.gif" >
1307    <A href = "star.html" > INFORMATION ABOUT STAR</A>
        <IMG src = "star.gif" >
        </HTML>
```

F I G. 15

| ID | ELEMENT TYPE | CHARACTER STRING | STORAGE LOCATION | LINKED LOCATION |
|---|---|---|---|---|
| 0 | TEXT | INFORMATION ABOUT CELESTIAL OBJECTS | ABSENT | ABSENT |
| 1 | LINK | INFORMATION ABOUT MOON | ABSENT | moon.html |
| 2 | IMAGE | ABSENT | moon.gif | ABSENT |
| 3 | LINK | INFORMATION ABOUT THE SUN | ABSENT | sun.html |
| 4 | IMAGE | ABSENT | sun.gif | ABSENT |
| 5 | LINK | INFORMATION ABOUT THE STAR | ABSENT | star.html |
| 6 | IMAGE | ABSENT | star.gif | ABSENT |

INFORMATION TERMINAL DEVICE

BACKGROUND OF THE INVENTION

1. Field of the Invention

The present invention relates to information terminal devices, and more particularly to small-sized information terminals such as mobile terminals, typically, mobile telephones, or portable information terminals which have a function of obtaining documents or images from servers through the Internet.

2. Description of the Background Art

The recent remarkable advances in information technology are now allowing users to instantaneously obtain various information through the Internet just by entering addresses into personal computers to access to desired locations. The information obtained includes hypertexts in HTML (HyperText Mark-up Language) and mails described in MIME (Multipurpose Internet Mail Extensions), for example. A user can request acquisition of information from a server or display the information obtained from the server on the screen by using a hypertext display device in which an application called a browser is installed or a mail display device in which an application called a mailer is installed.

Netscape Navigator and Internet Explorer are examples of widespread browsers. Such browsers can obtain image information (images) from a server through the Internet, and such images can be utilized as the background (background image) or a screen saver.

The recent developments of downsized equipment are presenting small-sized information terminals such as mobile telephones, portable information terminals, etc. in which a browser or a mailer is installed. Now the users are demanding that such small-sized information terminal devices should be equipped for the function of obtaining an image from a server and setting it as the background image etc., as is possible in personal computers.

When a user uses an image obtained from a server as a background image in a personal computer, it is possible to accumulatively store a plurality of images and select and use one of the images as the background image. Accordingly, users will also demand that such small-sized information terminal devices, too, be equipped with the function of selecting an image, as in the personal computers, in the operation of utilizing an image obtained from a server as the background image.

First Problem

In contrast with personal computers, such small-sized information terminal devices have smaller display screens, and different models of small-sized information terminal devices have display screens of different sizes. Therefore utilizing an image obtained from a server as a background image requires resizing to adjust the image to the display screen.

However, existing browsers are designed to be used in personal computers whose screen size is fixed, so they do not have the function of changing the size of an image before setting it as the background image.

Accordingly, conventional small-sized portable information terminals cannot use an image obtained from a sever as a background image.

It is possible to change the size of an image obtained from a server by using an image processing tool etc. and set it as the background image. However, this method is possible only for information terminal devices which have relatively large storage capacity and have a pointing device etc. for easy entering operation. Particularly, the method using an image processing tool is not practical for mobile telephones, since their storage capacity is severely limited and the entering operation would require extremely complicated operation using ten-keys and buttons.

Second Problem

Information terminal devices having no pointing device, particularly mobile telephones, cannot allow the users to easily select a desired image from among a plurality of images obtained from servers.

The following method is suggested to select a desired image from a plurality of images in an information terminal device having no pointing device, for example. That is to say, a user operates keys to specify one name among names of a plurality of images displayed on the screen to select the image corresponding to that name. This method requires the processing of generating names of the images, but this processing is not easy for the information terminal devices since any image is just a group of pixel data for the devices.

SUMMARY OF THE INVENTION

Therefore, a first object of the present invention is to provide an information terminal device which can obtain an image from a server and change the size of the image so that it can be used as the background image.

A second object of the present invention is to provide an information terminal device which can obtain and store images from a server and select and display an image that a user desires among the plurality of images stored.

The present invention has the following features to solve the problems explained above.

A first aspect of the invention is directed to an information terminal device which obtains an image from a server and displays the image in a display area of a screen, the information terminal device comprising:

an obtaining unit operable to obtain the image from the server;

an over-size decision unit operable to decide whether the entirety of the image obtained by the obtaining unit can be displayed within the display area of the screen; and a resizing unit operable to, when the over-size decision unit makes a negative decision, change the size of the image obtained by the obtaining unit so that the image can be displayed within the display area of the screen.

In accordance with the first aspect above, it is possible to obtain an image from a server and change the size of the image to use it as the background image.

According to a second aspect, in the first aspect, the over-size decision unit detects the size of the image obtained by the obtaining unit and compares the size of the image with the size of the display area of the screen to decide whether the entirety of the image can be displayed within the display area of the screen.

In accordance with the second aspect above, it is possible to decide whether the image extends past the display area of the screen.

According to a third aspect, in the first aspect, the display area of the screen is variable in size, and the over-size decision unit detects the size of the image obtained by the obtaining unit and the size of the display area of the screen and compares the two sizes with each other to decide whether the entirety of the image can be displayed within the display area of the screen.

In accordance with the third aspect above, it is possible to decide whether the image exceeds the size limit of the display area of the screen even when the display area of the screen is variable in size.

According to a fourth aspect, in the third aspect,
the over-size decision unit notifies the resizing unit of the detected two sizes, and
the resizing unit calculates an enlarging/shrinking ratio on the basis of the two sizes notified by the over-size decision unit and changes the size of the image obtained by the obtaining unit by enlarging/shrinking the image at the enlarging/shrinking ratio.

In accordance with the fourth aspect above, an enlarging/shrinking ratio is obtained from the size of the image and the size of the display area of the screen and the size of the image is changed by enlarging/shrinking the image at that ratio. Preferably, the enlarging/shrinking ratio is such a value that the size of the resized image coincides with the size of the display area of the screen, which is obtained by dividing the size of the display area of the screen by the size of the image.

According to a fifth aspect, in the first aspect,
the display area of the screen is variable in size, and
the over-size decision unit detects the lateral size and the longitudinal size of the image obtained by the obtaining unit and the lateral size and the longitudinal size of the display area of the screen and compares the two lateral sizes with each other and the two longitudinal sizes with each other to decide whether the entirety of the image can be displayed within the display area of the screen individually in the lateral direction and in the longitudinal direction.

In accordance with the fifth aspect above, it is possible to decide whether the image extends past the display area of the screen in the lateral direction and the longitudinal direction even if the display area of the screen is variable in size.

According to a sixth aspect, in the fifth aspect,
the over-size decision unit notifies the resizing unit of the detected two longitudinal sizes and the two lateral sizes, and
the resizing unit calculates an enlarging/shrinking ratio in the lateral direction on the basis of the two lateral sizes notified by the over-size decision unit and calculates an enlarging/shrinking ratio in the longitudinal direction on the basis of the two longitudinal sizes and changes the size of the image obtained by the obtaining unit by enlarging /shrinking the image in the lateral direction and in the longitudinal direction at a smaller one of the two enlarging/shrinking ratios.

In accordance with the sixth aspect above, an enlarging/shrinking ratio in the lateral direction is obtained from the lateral size of the image and the lateral size of the display area of the screen, and an enlarging/shrinking ratio in the longitudinal direction is obtained from the longitudinal size of the image and the longitudinal size of the display area of the screen, and the size of the image is changed by enlarging/shrinking the image at a smaller one of the two enlarging/shrinking ratios in the longitudinal and lateral directions. In this case, since the image is enlarged/shrunk at the same ratio in the longitudinal and lateral directions, the image is not compressed in shape after resized.

According to a seventh aspect, in the fifth aspect,
the over-size decision unit notifies the resizing unit of the detected two longitudinal sizes and the two lateral sizes, and
the resizing unit calculates an enlarging/shrinking ratio in the lateral direction on the basis of the two lateral sizes notified by the over-size decision unit and calculates an enlarging/shrinking ratio in the longitudinal direction on the basis of the two longitudinal sizes, and changes the size of the image obtained by the obtaining unit by enlarging/shrinking the image in the lateral direction and in the longitudinal direction at the respective enlarging/shrinking ratios.

In accordance with the seventh aspect, an enlarging/shrinking ratio in the lateral direction is obtained from the lateral size of the image and the lateral size of the display area of the screen, and an enlarging/shrinking ratio in the longitudinal direction is obtained from the longitudinal size of the image and the longitudinal size of the display area of the screen, and the size of the image is changed by enlarging/shrinking the image in the longitudinal direction and in the lateral direction at the respective enlarging/shrinking ratios. In this case, since the image is enlarged/shrunk in the longitudinal and lateral directions at separate ratios, the size of the resized image coincides with the size of the display area of the screen both in the longitudinal and lateral directions.

According to an eighth aspect, in the fifth aspect,
the information terminal device further comprises a form setting unit operable to set any of a first resizing form for changing the size by enlarging/shrinking the image in the lateral direction and the longitudinal direction at the same enlarging/shrinking ratio, a second resizing form for changing the size by removing part of the image, and a third resizing form for changing the size by enlarging/shrinking the image in the lateral direction and the longitudinal direction at separate enlarging/shrinking ratios, and
the resizing unit changes the size of the image obtained by the obtaining unit by using the form set by the form setting unit.

In accordance with the eighth aspect above, the first to third resizing forms having their respective advantages can be selected to realize resizing suited to the features of the image or resizing suited to the preference of a user.

According to a ninth aspect, in the first aspect, the resizing unit changes the size by removing part of the image obtained by the obtaining unit.

In accordance with the ninth aspect above, part of an image is removed to change its size. In this case, the resolution of the image is kept unchanged after the size is changed.

A tenth aspect is directed to an information terminal device which obtains and stores images from a server and displays any of the plurality of stored images, the information terminal device comprising:

an obtaining unit for obtaining from the server the images and a document which contains image information associated with the images and allowing a user to identify the images;

an image accumulative storage unit operable to accumulatively store the images obtained by the obtaining unit;

an image information extracting unit operable to extract the image information from the document obtained by the obtaining unit;

a list generating unit operable to generate a list composed of a plurality of pieces of the image information extracted by the image information extracting unit;

a list display unit operable to display the list generated by the list generating unit;

a selecting unit operable to select a piece of the image information specified by a user from among the plurality of pieces of image information contained in the list displayed by the list display unit in accordance with an instruction from the user; and an image display unit operable to obtain the image associated with the image information selected by the selecting unit from the image accumulative storage unit and displaying the image.

In accordance with the tenth aspect above, it is possible to obtain images from a server, store the images, select an image the user desires from among the plurality of images stored, and display the image.

According to an eleventh aspect, in the tenth aspect, when the image associated with the image information selected by the selecting unit is absent in the image accumulative storage unit, the image display unit requests the obtaining unit to obtain the image from the server.

In accordance with the eleventh aspect above, when the image associated with the selected image information is not accumulatively stored, that image is obtained from a server.

According to a twelfth aspect, in the tenth aspect, the server is a WWW server connected to the Internet, the image information is the storage location of the image, and the document which contains the image information is an HTML document.

In accordance with the twelfth aspect, while the information terminal device obtains an HTML document and images from a WWW server through the Internet and accumulatively stores the images, it also extracts the storage locations (e.g. "moon. gif") of the images from the HTML document. Since the storage location of an image is associated with the image and usually contains the name of the image, the user can easily know what kind of image it is.

A thirteenth aspect is directed to an image resize and display method performed by an information terminal device to obtain an image from a server and display the image in a display area of a screen, the image resize and display method comprising:

an obtaining step of obtaining the image from the server;

an over-size decision step of deciding whether the entirety of the image obtained in the obtaining step can be displayed within the display area of the screen; and a resizing step of, when the over-size decision step makes a negative decision, changing the size of the image obtained in the obtaining step so that the image can be displayed within the display area of the screen.

According to a fourteenth aspect, in the thirteenth aspect, the over-size decision step detects the size of the image obtained in the obtaining step and compares that size with the size of the display area of the screen to decide whether the entirety of the image can be displayed within the display area of the screen.

According to a fifteenth aspect, in the thirteenth aspect, the display area of the screen is variable in size, and the over-size decision step detects the size of the image obtained in the obtaining step and the size of the display area of the screen and compares the two sizes with each other to decide whether the entirety of the image can be displayed within the display area of the screen.

According to a sixteenth aspect, in the fifteenth aspect, the resizing step calculates an enlarging/shrinking ratio on the basis of the two sizes detected in the over-size decision step and changes the size of the image obtained in the obtaining step by enlarging/shrinking the image at the enlarging/shrinking ratio.

According to a seventeenth aspect, in the thirteenth aspect, the display area of the screen is variable in size, and the over-size decision step detects the lateral size and the longitudinal size of the image obtained in the obtaining step and the lateral size and the longitudinal size of the display area of the screen and compares the two lateral sizes with each other and the two longitudinal sizes with each other to decide whether the entirety of the image can be displayed within the display area of the screen individually in the lateral direction and in the longitudinal direction.

According to an eighteenth aspect, in the seventeenth aspect, the resizing step calculates an enlarging/shrinking ratio in the lateral direction on the basis of the two lateral sizes detected in the over-size decision step and calculates an enlarging/shrinking ratio in the longitudinal direction on the basis of the two longitudinal sizes, and changes the size of the image obtained in the obtaining step by enlarging/shrinking the image in the lateral direction and in the longitudinal direction at a smaller one of the two enlarging/shrinking ratios.

According to a nineteenth aspect, in the seventeenth aspect, the resizing step calculates an enlarging/shrinking ratio in the lateral direction on the basis of the two lateral sizes detected in the over-size decision step and calculates an enlarging/shrinking ratio in the longitudinal direction on the basis of the two longitudinal sizes, and changes the size of the image obtained in the obtaining step by enlarging/shrinking the image in the lateral direction and in the longitudinal direction at the respective enlarging/shrinking ratios.

According to a twentieth aspect, in the seventeenth aspect, the image resize and display method further comprises a form setting step of setting any of a first resizing form for changing the size by enlarging/shrinking the image in the lateral direction and the longitudinal direction at the same enlarging/shrinking ratio, a second resizing form for changing the size by removing part of the image, and a third resizing form for changing the size by enlarging/shrinking the image in the lateral direction and the longitudinal direction at separate enlarging/shrinking ratios, and the resizing step changes the size of the image obtained in the obtaining step by using the form set in the form setting step.

According to a twenty-first aspect, in the thirteenth aspect, the resizing step changes the size by removing part of the image obtained in the obtaining step.

A twenty-second aspect is directed to an image select and display method performed by an information terminal device to obtain images from a server, store the images, and select and display any of the plurality of stored images, the image select and display method comprising:

an obtaining step of obtaining from the server the images and a document which contains image information associated with the images and allowing a user to identify the image;

an image accumulative storage step of accumulatively storing the images obtained in the obtaining step;

an image information extracting step of extracting the image information from the document obtained in the obtaining step;

a list generating step of generating a list composed of a plurality of pieces of the image information extracted in the image information extracting step;

a list display step of displaying the list generated in the list generating step;

a selecting step of selecting a piece of the image information specified by a user from among the plurality of pieces of image information contained in the list displayed in the list display step in accordance with an instruction from the user; and an image display step of displaying the image associated with the image information selected in the selecting step among the images accumulatively stored in the image accumulative storage step.

According to a twenty-third aspect, in the twenty-second aspect, when the image associated with the image information selected in the selecting step is absent among the images accumulatively stored in the image accumulative storage step, the image display step obtains the image from the server and displays the image.

According to a twenty-fourth aspect, in the twenty-second aspect, the server is a WWW server connected to the Internet, the image information is the storage location of the image, and the document which contains the image information is an HTML document.

A twenty-fifth aspect is directed to a storage medium which contains a program for causing an information terminal device to perform an image resize and display method for obtaining an image from a server and displaying the image in a display area of a screen, the image resize and display method comprising:

an obtaining step of obtaining the image from the server;

an over-size decision step of deciding whether the entirety of the image obtained in the obtaining step can be displayed within the display area of the screen; and a resizing step of, when the over-size decision step makes a negative decision, changing the size of the image obtained in the obtaining step so that the image can be displayed within the display area of the screen.

A twenty-sixth aspect is directed to a storage medium which stores a program for causing an information terminal device to perform an image select and display method for obtaining images from a server, storing the images, and selecting and displaying any of the plurality of stored images, the image select and display method comprising:

an obtaining step of obtaining from the server the images and a document which contains image information associated with the images and allowing a user to identify the images;

an image accumulative storage step of accumulatively storing the images obtained in the obtaining step;

an image information extracting step of extracting the image information from the document obtained in the obtaining step;

a list generating step of generating a list composed of a plurality of pieces of the image information extracted in the image information extracting step;

a list display step of displaying the list generated in the list generating step;

a selecting step of selecting a piece of the image information specified by a user from among the plurality of pieces of image information contained in the list displayed in the list display step in accordance with an instruction from the user; and an image display step of displaying the image associated with the image information selected in the selecting step among the images accumulatively stored in the image accumulative storage step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an example of the structure of the terminal 10 shown in FIG. 1.

FIG. 13 is a diagram showing an example of the HTML document that the HTML accumulative storage unit 1006 stores in step S207 of FIG. 12.

FIG. 15 is a diagram showing an example of the HTML element information accumulatively stored in the HTML element information accumulative storage unit 1008 of FIG. 10 (which is the information obtained by analyzing the HTML document shown in FIG. 13)

DESCRIPTION OF THE PREFERRED EMBODIMENTS

Figure 1:
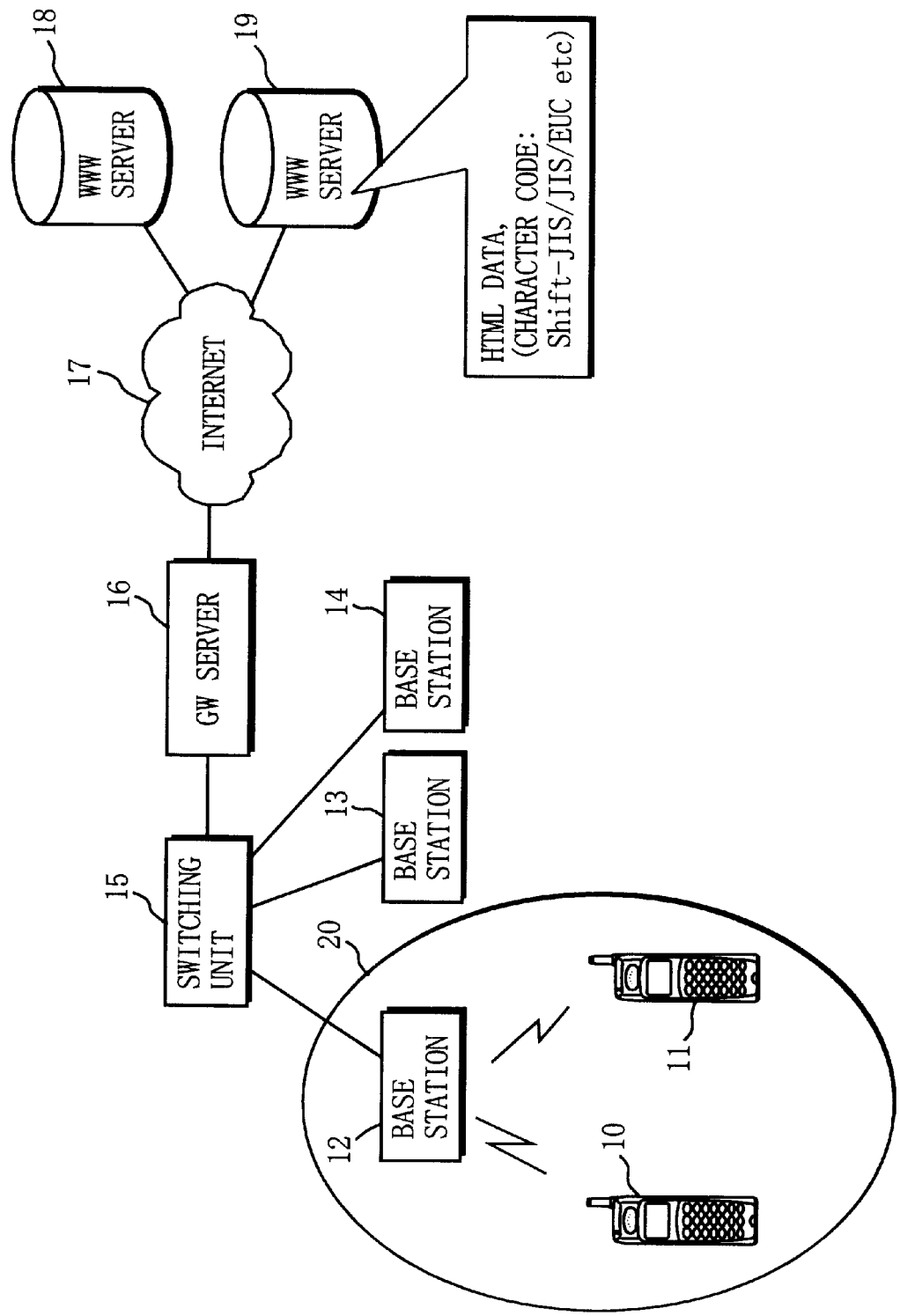
FIG. 1 is a block diagram showing the configuration of a mobile communication system which is an example of an application of the present invention.

Embodiments of the present invention will now be described in detail referring to the drawings.

First, a mobile communication system to which the present invention is applied will be described.

FIG. 1 is a block diagram showing the configuration of a mobile communication system as an example of an application of the invention. In FIG. 1, the mobile communication system includes a GW (gateway) server 16 connected to the Internet 17, a plurality of WWW servers also connected to the Internet 17 (which are represented by WWW servers 18 and 19 here), a switching unit 15 connected to the GW server 16, a plurality of base stations connected to and controlled by the exchange unit 15 (which are represented by base stations 12 to 14 here), radio zones controlled by the base stations (which are represented by the radio zone 20 controlled by the base station 12 here), and mobile terminals located in any of the radio zones (which are represented by the mobile terminals 10 and 11 located in the radio zone 20 here).

The WWW servers 18 and 19 store HTML documents described in hypertext such as HTML, images, etc. The terminals 10 and 11 can request acquisition of information from the WWW servers 18 and 19 to obtain information held in the WWW servers 18 and 19 through the Internet 17 and display the information by using display screens on the terminals 10 and 11. For the communication between the base station 12 and the terminals .10 and 11 in the radio zone 20, a digital communication system using CDMA is used, for example.

FIG. 2 is a block diagram showing an example of the structure of the terminal 10 shown in FIG. 1. In FIG. 2, the terminal 10 has an antenna 21, a radio controller 22, a modulator 23, a demodulator 24, a channel CODEC 25, a speech input unit 26, a speech output unit 27, an input unit 28, a display 29, and a communication application unit 30.

The radio controller 22 has the function of receiving modulated data from the modulator 23 and transmitting the data on a radio carrier from the antenna 21 and the function of receiving a signal in a given frequency band from among high-frequency signals induced on the antenna 21. The modulator 23 modulates transmission data outputted from the channel CODEC 25 by a given system (e.g. π/4 shift DQPSK modulation) and outputs it to the radio controller 22. The demodulator 24 demodulates the signal received from the radio controller 22 and supplies it to the channel CODEC 25. The channel CODEC 25 distributes the input data from the demodulator 24 to the speech output unit 27 and the communication application unit 30. It also distributes speech input from the speech input unit 26 to the modulator 23 and the communication application unit 30. Further, it distributes data input from the communication application unit 30 to the modulator 23 and the speech output unit 27.

The input unit 28 is composed of a keyboard or buttons, for example, which processes entry of dial numbers, display screen manipulating data, etc. The display 29 is composed of a display device etc., which screen-displays or vibration-outputs data outputted from the communication application unit 30, for example. The communication application unit 30 includes a CPU 31, RAM 32, ROM 33, VRAM 34, etc., which controls connection of communications and processing of transmission/received data, such as generation of transmission data, display and storage of received data, etc. in the terminal 10.

Figure 3:
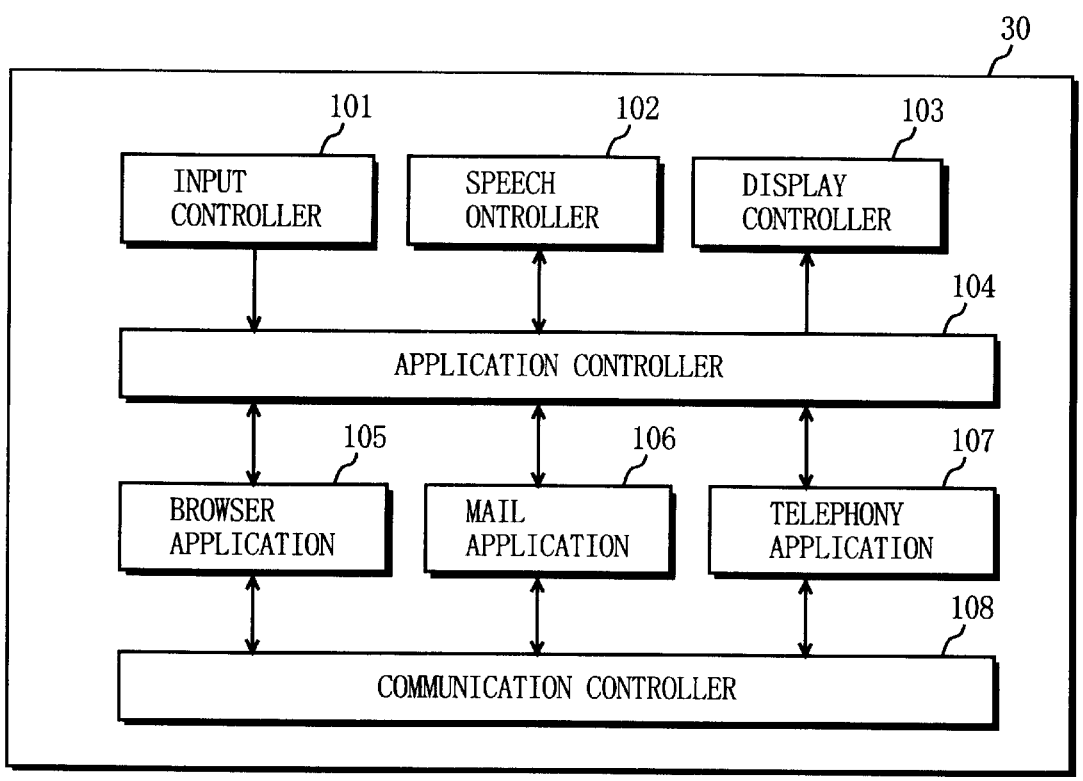
FIG. 3 is a block diagram showing an example of the structure of the communication application unit 30 shown in FIG. 2.

FIG. 3 is a block diagram showing an example of the structure of the communication application unit 30 shown in FIG. 2. In FIG. 3, the communication application unit 30 includes an input controller 101, a speech controller 102, a display controller 103, an application controller 104, a browser application 105, a mail application 106, a telephony application 107, and a communication controller 108.

The input controller 101 notifies the application controller 104 of the input key information etc. received from the input unit 28. The speech controller 102 controls the posting of the speech received from the speech input unit 26 to the application controller 104 and the output of the speech sent from the application controller 104 to the channel CODEC 25. The display controller 103 controls the output of display information notified by the application controller 104 to the display 29. The application controller 104 controls switching between the plurality of applications installed in the terminal 10 and the distribution of information between the applications and the input controller 101, speech controller 102 and display controller 103.

It is assumed here that three applications are installed in the terminal 10: the browser application 105, mail application 106 and telephony application 107. However, needless to say, the applications installed are not limited to these three applications.

The plurality of applications installed in the terminal 10 can be classified into speech service applications and character service applications. The speech service application supports only speech without performing transmission/reception of character data, image data, etc. The character service application performs transmission/reception of character data, image data, etc. and supports image display of information to be transmitted/received. For example, the browser application 105 and the mail application 106 are character service applications and the telephony application 107 is a speech service application.

The communication controller 108 controls connection of calls to be made or received, data communication, etc. in accordance with instructions from the applications (105 to 107).

In the first embodiment described below, a program for allowing the terminal 10 to execute an image resize and display method of the invention is implemented in the browser application 105 installed in the terminal 10. In the communication application unit 30, the communication controller 108 provides control according to instructions from the browser application 105 which contains this program, whereby the terminal 10 can perform the image resize and display processing which will be explained later.

In a second embodiment, a program for allowing the terminal 10 to execute an image select and display method of the invention is implemented in the browser application 105 installed in the terminal 10. In the communication application unit 30, the communication controller 108 provides control according to instructions from the browser application 105 which contains this program, whereby the terminal 10 can perform the image select and display processing which will be described later.

Now, the following three methods are suggested as methods for implementing the above-mentioned programs in the browser application 105 provided in the terminal 10. In a first method, the programs are previously implemented in the browser application 105 before shipment of the terminal 10. In a second method, the programs are supplied to the terminal 10 through a network like the Internet 17, a mobile communication network, etc. and implemented in the browser application. In a third method, the programs are presented to the user in a form stored in a portable recording medium like a CD-ROM and the user reads the programs from the portable recording medium using a personal computer etc. and transfers them to the terminal 10 to implement them in the browser application. The second and third methods require that another program for allowing the terminal 10 to perform the implementing processing should be attached to each program.

The description herein shows an example in which the programs are implemented in the browser application 105. However, needless to say, the programs may be implemented in other application provided in the terminal 10, or a new application dedicated to the programs may be provided in the terminal 10.

First Embodiment

Figure 4:
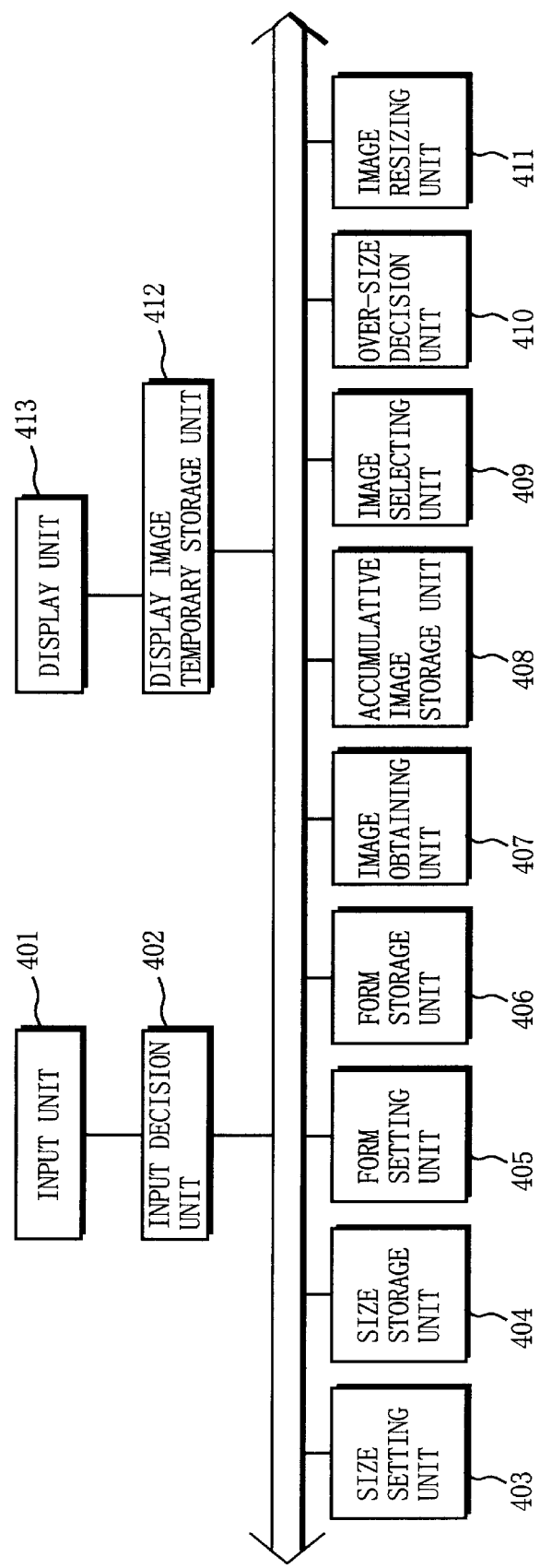
FIG. 4 is a block diagram showing the functional structure of the terminal of the first embodiment of the invention.

FIG. 4 is a block diagram showing the functional structure of a terminal according to a first embodiment of the invention. The terminal shown in FIG. 4 corresponds to the terminals 10 and 11 shown in FIG. 1. Its hardware structure is shown in FIG. 2 and the software structure of the communication application unit 30 of FIG. 2 is shown in FIG. 3.

Figure 5:
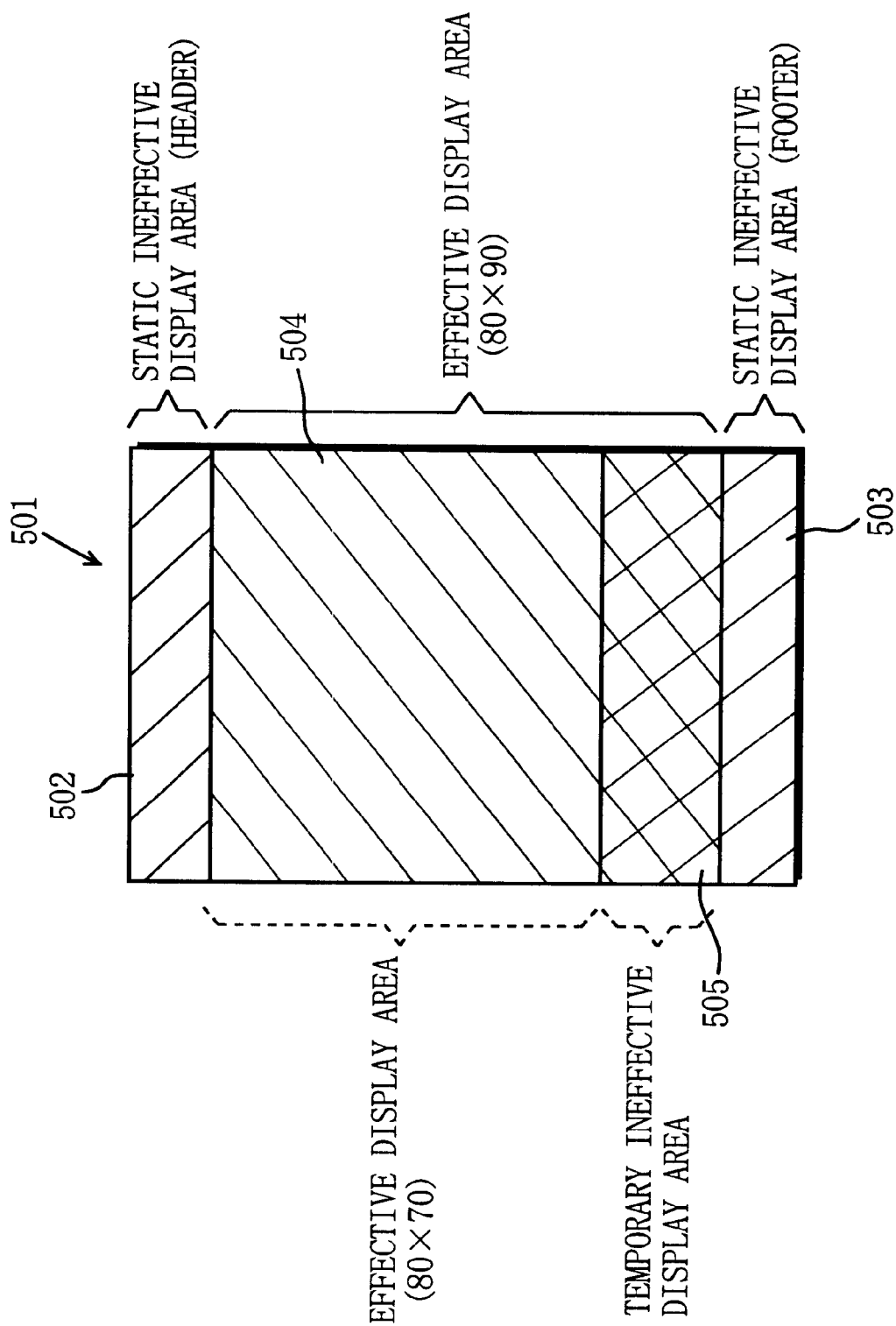
FIG. 5 is a diagram showing an example of the structure of a screen in which the display 413 of FIG. 4 presents a display.

FIG. 5 is a diagram showing an example of the structure of a screen on which the display unit 413 of FIG. 4 presents a display. In FIG. 5, the screen has a display area 501 where an image can be displayed, which is composed of an effective display area and an ineffective display area.

In the example shown in the diagram, the ineffective display area includes two areas at the top and bottom of the screen (which are hereinafter called header 502 and footer 503). Symbols showing the statuses of the terminal (e.g. the remainder of the battery, strength of received electric waves, etc.) are displayed in the header 502 and the footer 503.

The effective display area 504 corresponds to the area other than the ineffective areas, i.e. the area between the header 502 and the footer 503, where an image obtained from the WWW server 18 or 19 is displayed as the background image.

Part of the effective display area 504 (the area shown by the reference number 505 in the diagram) is used as an ineffective display area as needed. An area like the area 505, which is part of the effective display area 504 but used as an ineffective display area as needed, is called "temporary ineffective display area." In contrast, the header 502 and the footer 503 are called "static ineffective display area."

That is to say, the effective display area 504 is variable in size. The effective display area 504 in the example shown in the diagram can be (80×90) or (80×70).

In this embodiment, the program implemented in the browser application 105 in FIG. 3 as stated above is an image resize/display program for changing the size of an image obtained from the WWW server 18 or 19 to adjust it to the screen size of the display 29 (the display 413 of FIG. 4) and displaying the image. The CPU 31 operates in accordance with this image resize/display program to realize the functions of the blocks shown in FIG. 4 (which are described below).

In FIG. 4, the terminal of the first embodiment of the invention includes an input unit 401, an input decision unit 402, a size setting unit 403, a size storage unit 404, a form setting unit 405, a form storage unit 406, an image obtaining unit 407, an accumulative image storage unit 408, an image selecting unit 409, an over-size decision unit 410, an image resizing unit 411, a display image temporary storage unit 412 and a display 413.

The input unit 401 receives entry of instructions from a user. The input decision unit 402 recognizes the instructions received at the input unit 401 (an instruction for setting the effective display area size, an instruction for setting the image resizing form, an instruction for obtaining an image, an instruction for selecting an image, etc.). The size setting unit 403 sets the effective display area size. The size storage unit 404 stores the effective display area size set by the size setting unit 403.

The form setting unit 405 sets the image resizing form. The form storage unit 406 stores the image resizing form set by the form setting unit 405.

The image obtaining unit 407 obtains images from the WWW servers 18 and 19 through the Internet 17. The accumulative image storage unit 408 accumulatively stores images obtained by the image obtaining unit 407.

The image selecting unit 409 selects one of the images accumulatively stored in the accumulative image storage unit 408. The over-size decision unit 410 compares the size of the image selected by the image selecting unit 409 with the effective display area size stored in the size storage unit 404 to decide whether the entirety of that image can be displayed within the effective display area 504.

The image resizing unit 411 changes the size of the image selected by the image selecting unit 409 by using the form stored in the form storage unit 406 so that the image fits the effective display area size stored in the size storage unit 404.

The display image temporary storage unit 412 temporarily stores, as a display image, the image selected by the image selecting unit 409 or the image resized by the image resizing unit 411 (i.e. an image changed in size). The display 413 displays the image stored in the display image temporary storage unit 412 as the background image in the effective display area 504.

Figure 6:
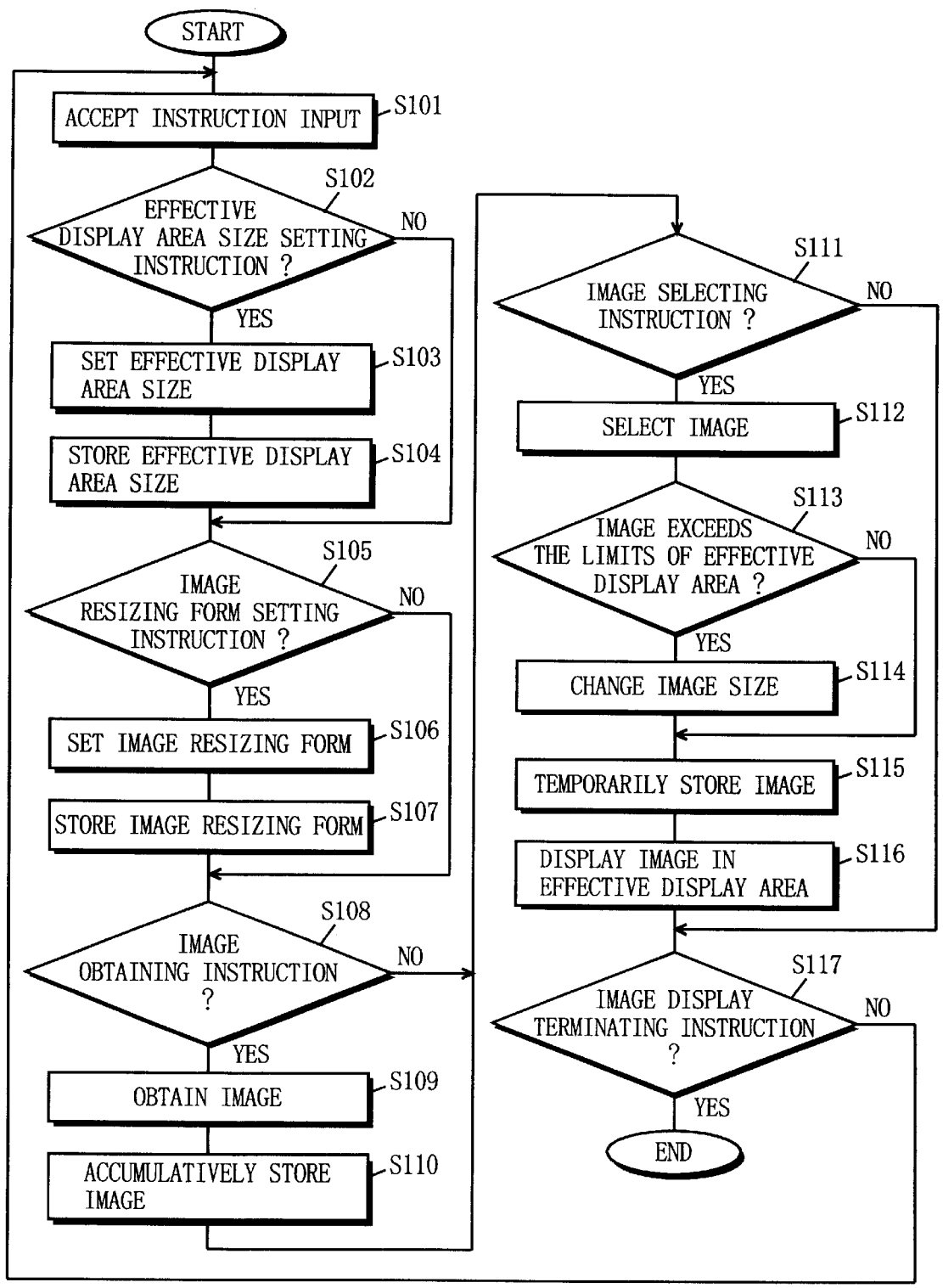
FIG. 6 is a flowchart showing the operation in which the terminal shown in FIG. 4 obtains an image from the WWW servers 18 and 19, changes the size of the image, and displays the image as the background image in the effective display area 504 shown in FIG. 5.

FIG. 6 is a flowchart showing the operation in which the terminal shown in FIG. 4 obtains an image from the WWW server 18 or 19, changes its size, and displays it as a background image in the effective display area 504 shown in FIG. 5. Referring to FIGS. 4 to 6, the operation of the terminal of the first embodiment of the invention will now be described.

In FIG. 6, when power is supplied to the terminal, then the input unit 401 starts the operation of accepting instruction input from the user (step S101). Next, the input decision unit 402 decides whether the instruction received at the input unit 401 is an instruction for setting the effective display area size (step S102). When the result of decision made in step S102 is NO, then step S105 follows.

When the decision made in step S102 is YES, the size setting unit 403 sets the effective display area size (step S103) Next, the size storage unit 404 stores the size set in step S103 by the size setting unit 403 (step S104).

Next, the input decision unit 402 decides whether the instruction received at the input unit 401 is an instruction for setting the image resizing form (step S105). When the decision made in step S105 is NO, the step S108 follows.

When the decision made in step S105 is YES, the form setting unit 405 sets the image resizing form (step S106) Next, the form storage unit 406 stores the form that the form setting unit 405 set in step S106 (step S107).

Next, the input decision unit 402 decides whether the instruction received at the input unit 401 is an instruction for obtaining an image (step S108). When the decision made in step S108 is NO, the step S111 follows.

When the decision made in step S108 is YES, the image obtaining unit 407 obtains an image from the WWW server 18 or 19 through the Internet 17 (step S109). Next the accumulative image storage unit 408 accumulatively stores the image obtained in step S109 by the image obtaining unit 407 (step S110).

Next, the input decision unit 402 decides whether the instruction received at the input potion 401 is an instruction for selecting an image (step S111). When the decision made in step S111 is NO, the step S117 follows.

When the decision made in step S111 is YES, the image selecting unit 409 selects one from among the images accumulatively stored in step S110 in the accumulative image storage unit 408 (step S112).

Next, the over-size decision unit 410 compares the size of the image selected in step S110 by the image selecting unit 409 with the size of the effective display area stored in step S104 in the size storage unit 404 to decide whether that image exceeds the size limit of the effective display area 504 (step S113). When the decision made in step S113 is NO, the steps S115 to S117 follow.

When the decision made in step S113 is YES, the image resizing unit 411 changes the size of the image selected in step S107 by the image selecting unit 409 by using the form stored in step S107 in the form storage unit 406 so that the image fits the effective display area size stored in the size storage unit 404 in step S104 (step S114). Then the steps S115 to S117 follow.

In step S115, the display image temporary storage unit 412 temporarily stores the display image. That is to say, the display image temporary storage unit 412 temporarily stores, as a display image, the image selected in step S110 by the image selecting unit 409 or the image resized in step S114 by the image resizing unit 411 (i.e. an image changed in size).

In step S116, the display 413 displays the image stored in the display image temporary storage unit 412 (i.e. the image selected in step S112 or the image resized in step S114) as the background image within the effective display area 504.

In step S117, the input decision unit 402 decides whether the instruction received at the input unit 401 is an instruction for terminating the image display. When the decision made in step S117 is YES, the display 413 terminates the image display; when the decision is NO, then the above-described steps S101 to S117 are executed again.

The terminal operates as roughly described above.

Next, important steps among the steps S101 to S117 will be described in greater detail.

The process of setting and storing the effective display area size in steps S103 and S104 is performed as shown below. The size setting unit 403 contains some previously prepared sizes that can be set as the effective display area size; when the user presses a particular button in the input unit 401, then the size setting unit 403 selects one of the sizes and sets it as the effective display area size. The size set by the size setting unit 403 is stored in the size storage unit 404.

In the example shown in FIG. 5, the size setting unit 403 sets the size (80×90) or (80×70), and the set size is stored in the size storage unit 404.

Alternatively, the user may operate the keyboard in the input unit 401 to specify an arbitrary size, and the size setting unit 403 may set the specified size as the effective display area size.

The process of setting and storing the image resizing form in steps S106 and S107 is performed as below. That is to say, the image resizing form setting unit 405 contains some previously prepared image resizing forms; when the user presses a particular button in the input unit 401, the image resizing form setting unit 405 selects one of the forms and sets that form as the image resizing form. The form set by the form setting unit 405 is stored in the form storage unit 406.

The image resizing forms prepared in the image resizing form setting unit 405 include three, first to third, image resizing forms.

Figure 7:
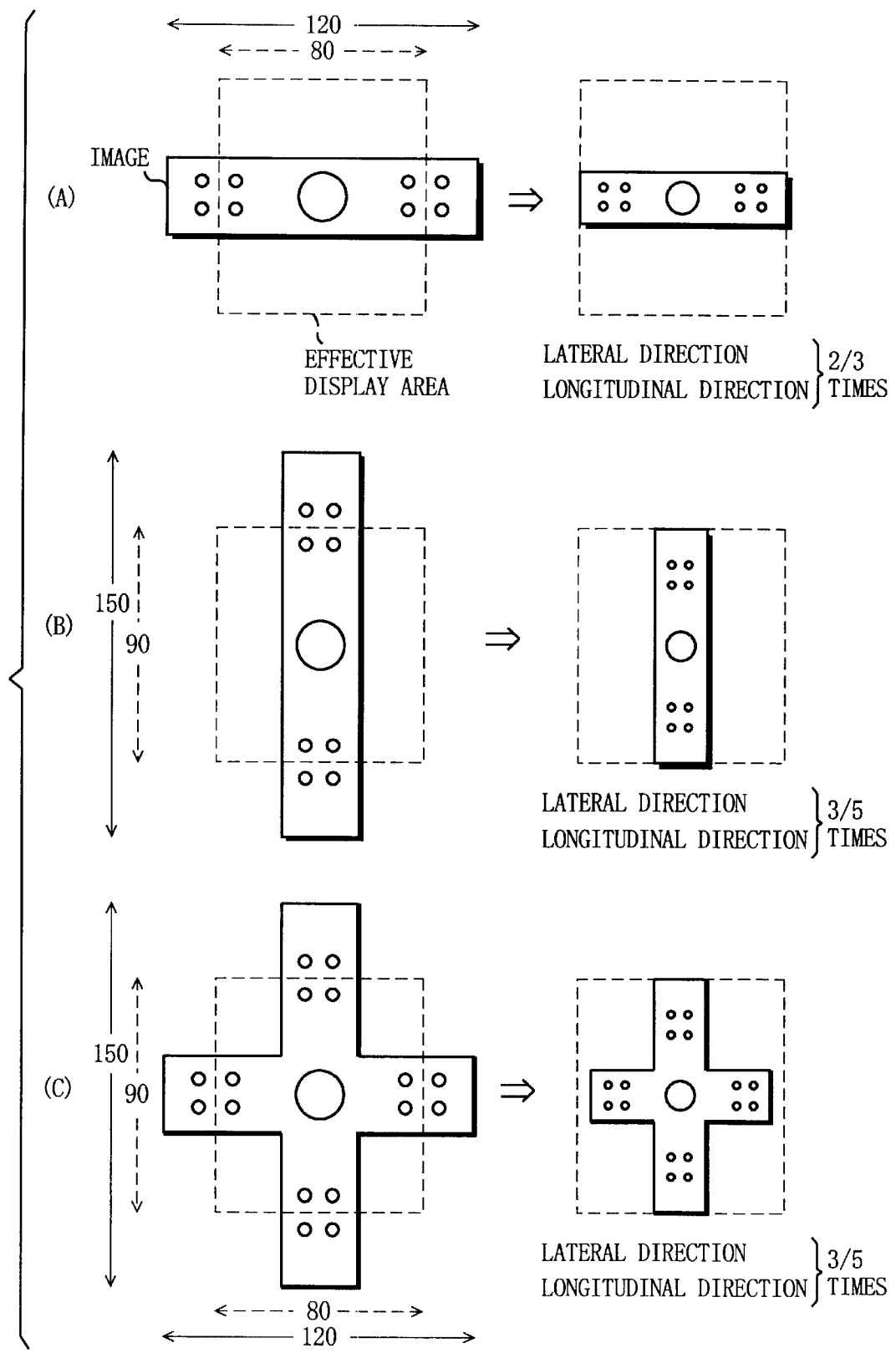
FIG. 7A is a diagram visually showing a first image resizing form (an example in which the image extends past the lateral limits of the effective display area).
FIG. 7B is a diagram visually showing the first image resizing form (an example in which the image extends past the longitudinal limits of the effective display area).
FIG. 7C is a diagram visually showing the first image resizing form (an example in which the image extends past the lateral and longitudinal limits of the effective display area).
Figure 8:
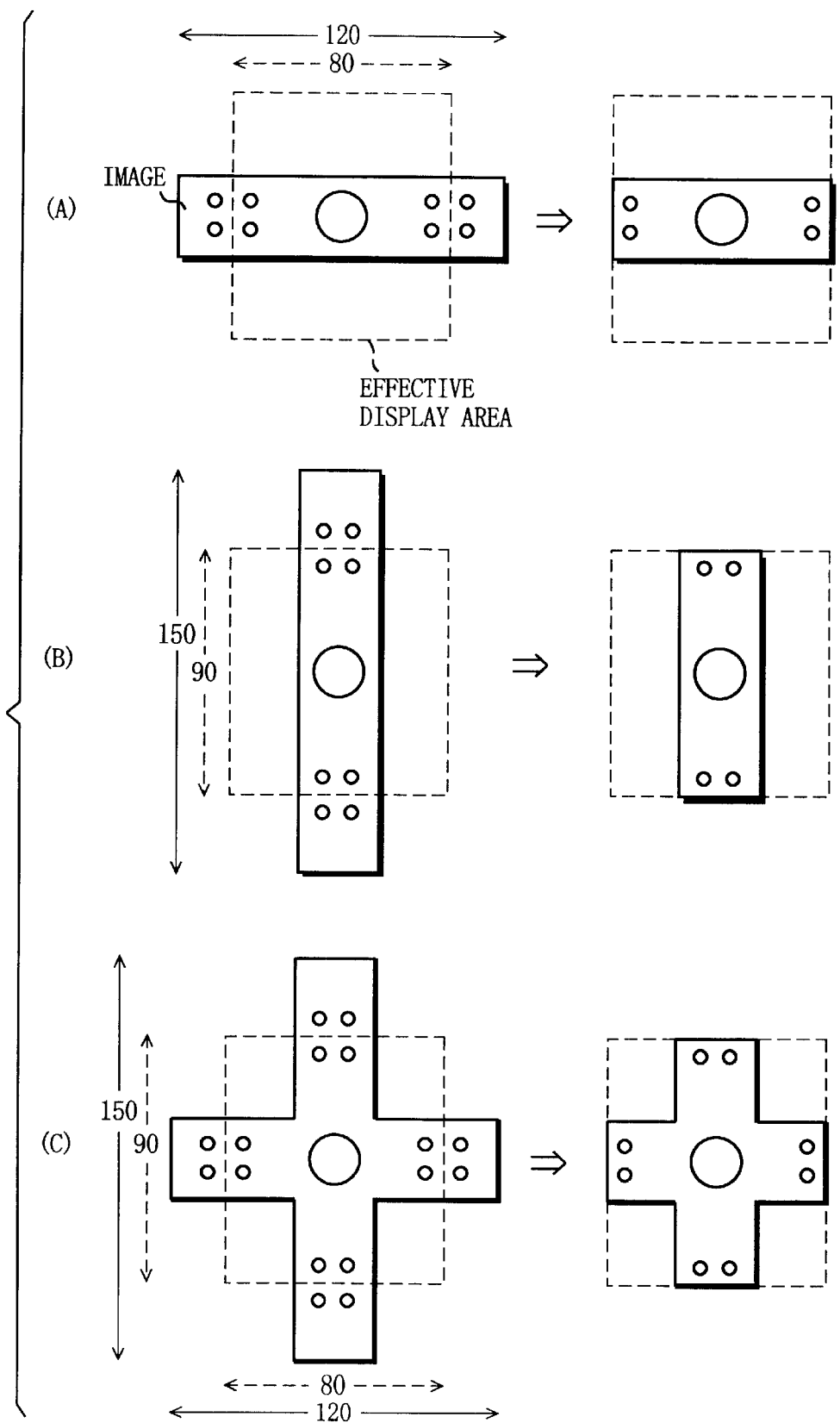
FIG. 8A is a diagram visually showing a second image resizing form (an example in which the image extends past the lateral limits of the effective display area).
FIG. 8B is a diagram visually showing the second image resizing form (an example in which the image extends past the longitudinal limits of the effective display area).
FIG. 8C is a diagram visually showing the second image resizing form (an example in which the image extends past the lateral and longitudinal limits of the effective display area).
Figure 9:
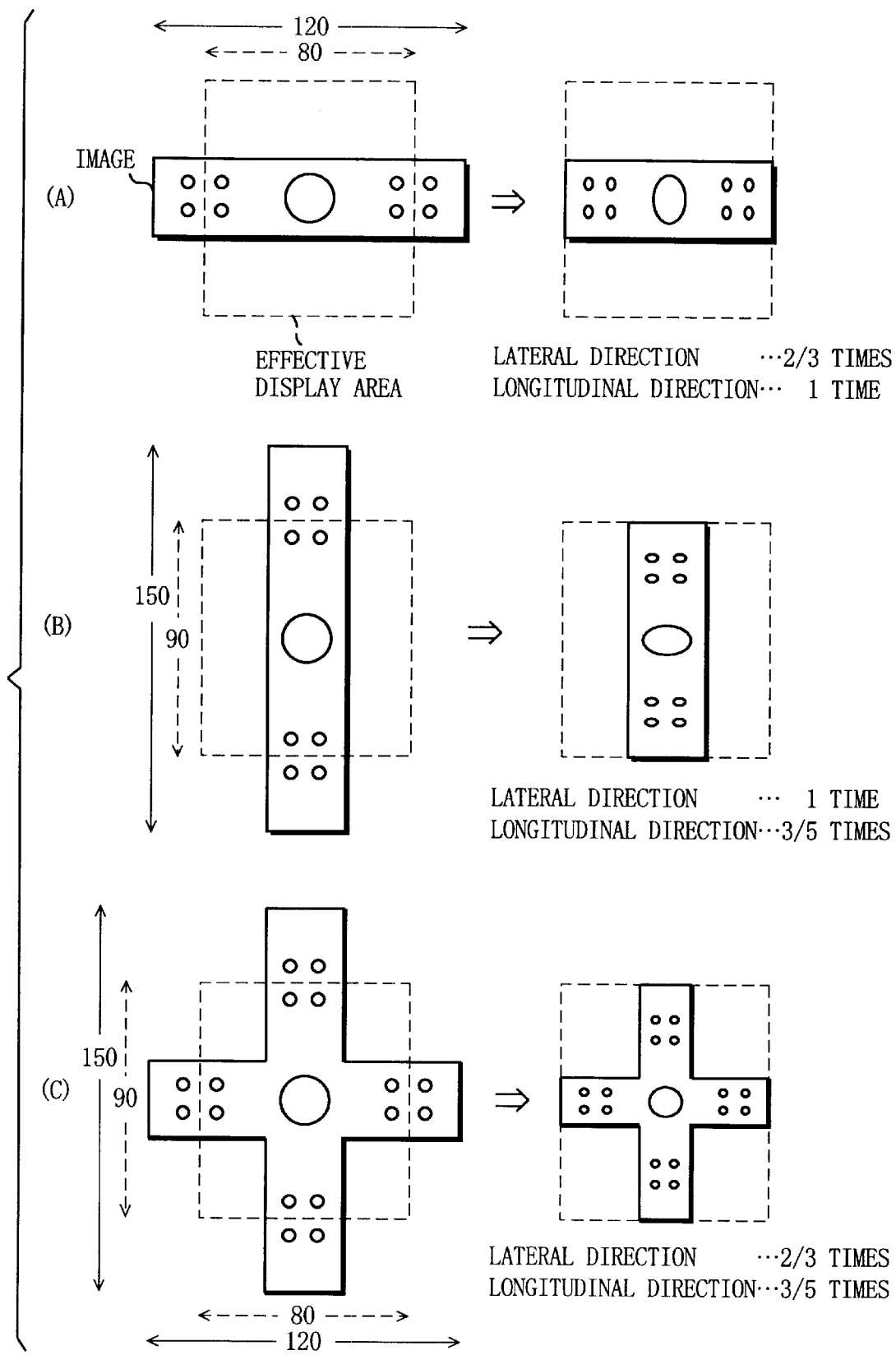
FIG. 9A is a diagram visually showing a third image resizing form (an example in which the image extends past the lateral limits of the effective display area).
FIG. 9B is a diagram visually showing the third image resizing form (an example in which the image extends past the longitudinal limits of the effective display area).
FIG. 9C is a diagram visually showing the third image resizing form (an example in which the image extends past the lateral and longitudinal limits of the effective display area).

FIGS. 7A to 7C are diagrams visually showing a first image resizing form, FIGS. 8A to 8C are diagrams visually showing a second image resizing form, and FIGS. 9A to 9C are diagrams visually showing a third image resizing form.

As shown in FIGS. 7A to 7C, the first image resizing form shrinks an image at the same ratio in the longitudinal and lateral (height and width) directions (that is, it reduces the resolution by decimating pixels at a certain rate). This first form alters the size of the image so that its entirety can be accommodated within the effective display area with its aspect ratio unchanged (i.e. without being compressed in shape).

As shown in FIGS. 8A to 8C, the second image resizing form removes part of an image to reduce the image size. The second form keeps the resolution unchanged, though the parts extending past the effective display area are lost in the resized image.

As shown in FIGS. 9A to 9C, the third image resizing form shrinks an image at separate ratios in the longitudinal and lateral directions. This third form alters the size of the image so that its entirety can be properly displayed without loss within the effective display area, though its shape is compressed.

In the accumulative image storage processing in step S110, the accumulative image storage unit 408 assigns sequential numbers (0, 1, 2, . . . ), for example, to the accumulated images as their identifiers (IDs).

The image selecting processing in step S112 is performed as follows. When the accumulative image storage unit 408 stores only one image in step S110, then the image selecting unit 409 selects that image.

When the accumulative image storage unit 408 stores a plurality of images in step S110, then the image selecting unit 409 refers to the identifies given in step S110 by the accumulative image storage unit 408 to select one from among the plurality of images.

An example of the simplest selecting method is shown here. That is to say, when the accumulative image storage unit 408 stores three images (ID=1 to 3) in step S110, then the image selecting unit 409 selects the first image (ID=1), for example.

The over-size decision processing in step S113 is performed as follows.

The over-size decision unit 410 first detects the size of the image that was selected in step S112 by the image selecting unit 409. Images supplied from the WWW servers 18 and 19 contain data indicating their size, which allows detection of the image size.

Next the over-size decision unit 410 compares the size of the image with the size of the effective display area in the lateral direction and in the longitudinal direction to decide whether the image can be displayed within the screen.

The image size changing process in step S114 is performed as shown below.

(1) When the form storage unit 406 stores the first form in step S107 and the over-size decision unit 410 decides that it is over size in the lateral direction in the over-size decision process in step S113, then the image resizing unit 411 calculates such a resizing ratio that the lateral size of the resized image coincides with the lateral size of the effective display area and shrinks the image at that resizing ratio both in the longitudinal and lateral directions.

FIG. 7A shows an example of the processing (1). In this example, the over-size decision unit 410 compares the lateral dimension 120 of the image with the lateral dimension 80 of the effective display area and decides that the image exceeds the lateral size limit. Accordingly the image resizing unit 411 divides 80 by 120 to obtain the resizing ratio (2/3). Then it shrinks the image to (2/3) both in the longitudinal and lateral directions on the basis of the first form.

(2) When the form storage unit 406 stores the first form in step S107 and the over-size decision unit 410 decides that it is over size in the longitudinal direction in the over-size decision process in step S113, then the image resizing unit 411 calculates such a resizing ratio that the longitudinal size of the resized image coincides with the longitudinal size of the effective display area and shrinks the image at that resizing ratio both in the longitudinal and lateral directions.

FIG. 7B shows an example of the processing (2). In this example, the over-size decision unit 410 compares the longitudinal dimension 150 of the image with the longitudinal dimension 90 of the effective display area and decides that the image exceeds the longitudinal size limit. Accordingly the image resizing unit 411 divides 90 by 150 to obtain the resizing ratio (3/5). Then it shrinks the image to (3/5) both in the longitudinal and lateral directions on the basis of the first form.

(3) When the form storage unit 406 stores the first form in step S107 and the over-size decision unit 410 decides that it is over size in the longitudinal and lateral directions in the over-size decision process in step S113, then the image resizing unit 411 calculates such a resizing ratio that the longitudinal size of the resized image coincides with the longitudinal size of the effective display area and such a resizing ratio that the lateral size of the resized image coincides with the lateral size of the effective display area. The image resizing unit 411 then shrinks the image at a smaller one of the two resizing ratios both in the longitudinal and lateral directions.

FIG. 7C shows an example of the processing (3). In this example, the over-size decision unit 410 compares the lateral dimension 120 of the image with the lateral dimension 80 of the effective display area and decides that the image exceeds the lateral size limit. It also compares the longitudinal dimension 150 of the image with the longitudinal dimension 90 of the effective display area and decides that the image exceeds the longitudinal size limit. Accordingly the image resizing unit 411 divides 80 by 120 to obtain the resizing ratio (2/3), and also, it divides 90 by 150 to obtain the resizing ratio (3/5). Then the image resizing unit 411 shrinks the image to (3/5) both in the longitudinal and lateral directions on the basis of the first form (because (3/5) is smaller than (2/3)).

(4) When the form storage unit 406 stores the second form in step S107 and the over-size decision unit 410 decides that it is over size in the lateral direction in the over-size decision process in step S113, then the image resizing unit 411 removes the parts near the left and right ends of the image which are supposed to extend past the limits of the effective display area.

FIG. 8A shows an example of the processing (4). In this example, the over-size decision unit 410 compares the lateral dimension 120 of the image with the lateral dimension 80 of the effective display area and decides that the image exceeds the lateral size limit. Accordingly the image resizing unit 411 removes the left end (which corresponds to a lateral dimension of 20) and the right end (which corresponds to a lateral dimension of 20) from the image on the basis of the second form. Alternatively, instead of equally removing the right and left ends of the image, only the left end (corresponding to a lateral dimension of 40) or only the right end (corresponding to a lateral dimension of 40) may be removed.

(5) When the form storage unit 406 stores the second form in step S107 and the over-size decision unit 410 decides that it is over size in the longitudinal direction in the over-size decision process in step S113, then the image resizing unit 411 removes the parts near the upper and lower ends of the image which are supposed to extend past the limits of the effective display area.

FIG. 8B shows an example of the processing (5). In this example, the over-size decision unit 410 compares the longitudinal dimension 150 of the image with the longitudinal dimension 90 of the effective display area and decides that the image exceeds the longitudinal size limit. Accordingly the image resizing unit 411 removes the upper end (which corresponds to a longitudinal dimension of 30) and the lower end (which corresponds to a longitudinal dimension of 30) from the image on the basis of the second form. Alternatively, instead of equally removing the upper and lower ends of the image, only the upper end (corresponding to a longitudinal dimension of 60) or only the lower end (corresponding to a longitudinal dimension of 60) may be removed.

(6) When the form storage unit 406 stores the second form in step S107 and the over-size decision unit 410 decides that it is over size in the longitudinal and lateral directions in the over-size decision process in step S113, then the image resizing unit 411 first removes the left and right ends of the image which are supposed to extend past the limits of the effective display area and then removes the upper and lower ends of the image which are supposed to extend past the limits of the effective display area.

FIG. 8C shows an example of the processing (6). In this example, the over-size decision unit 410 compares the lateral dimension 120 of the image with the lateral dimension 80 of the effective display area and decides that the image exceeds the lateral size limit. The over-size decision unit 410 also compares the longitudinal dimension 150 of the image with the longitudinal dimension 90 of the effective display area and decides that the image exceeds the longitudinal size limit. Accordingly, on the basis of the second form, the image resizing unit 411 first removes the left end of the image (which corresponds to a lateral dimension of 20) and the right end (which corresponds to a lateral dimension of 20) from the image and then it removes the upper end (which corresponds to a longitudinal dimension of 30) and the lower end (which corresponds to a longitudinal dimension of 30).

(7) When the form storage unit 406 stores the third form in step S107 and the over-size decision unit 410 decides that it is over size in the lateral direction in the over-size decision process in step S113, then the image resizing unit 411 calculates such a resizing ratio that the lateral size of the converted image coincides with the lateral size of the effective display area and shrinks the image at that resizing ratio in the lateral direction.

FIG. 9A shows an example of the processing (7) In this example, the over-size decision unit 410 compares the lateral dimension 120 of the image with the lateral dimension 80 of the effective display area and decides that the image exceeds the lateral size limit. Accordingly the image resizing unit 411 divides 80 by 120 to obtain the resizing ratio (2/3). Then the image resizing unit 411 shrinks the image to (2/3) in the lateral direction on the basis of the third form.

(8) When the form storage unit 406 stores the third form in step S107 and the over-size decision unit 410 decides that it is over size in the longitudinal direction in the over-size decision process in step S113, then the image resizing unit 411 calculates such a resizing ratio that the longitudinal size of the resized image coincides with the longitudinal size of the effective display area and shrinks the image at that resizing ratio in the longitudinal direction.

FIG. 9B shows an example of the processing (8). In this example, the over-size decision unit 410 compares the longitudinal dimension 150 of the image with the longitudinal dimension 90 of the effective display area and decides that the image exceeds the longitudinal size limit. Accordingly the image resizing unit 411 divides 90 by 150 to obtain the resizing ratio (3/5). Then the image resizing unit 411 shrinks the image to (3/5) in the longitudinal direction on the basis of the third form.

(9) When the form storage unit 406 stores the third form in step S107 and the over-size decision unit 410 decides that it is over size in the longitudinal and lateral directions in the over-size decision process in step S113, then the image resizing unit 411 calculates such a resizing ratio that the lateral size of the resized image coincides with the lateral size of the effective display area and such a resizing ratio that the longitudinal size of the resized image coincides with the longitudinal size of the effective display area. Then the image resizing unit 411 first shrinks the image at the former resizing ratio in the lateral direction and next shrinks the laterally-shrunk image at the latter resizing ratio in the longitudinal direction.

FIG. 9C shows an example of the processing (9). In this example, the over-size decision unit 410 compares the lateral dimension 120 of the image with the lateral dimension 80 of the effective display area and decides that the image exceeds the lateral size limit. It also compares the longitudinal dimension 150 of the image with the longitudinal dimension 90 of the effective display area and decides that the image exceeds the longitudinal size limit. Accordingly the image resizing unit 411 divides 80 by 120 to obtain the resizing ratio (2/3) and also divides 90 by 150 to obtain the resizing ratio (3/5). Then, on the basis of the third form, the image resizing unit 411 first shrinks the image in the lateral direction to (2/3) and next shrinks the laterally-shrunk image to (3/5) in the longitudinal direction.

Although the terminal obtains images from the WWW servers 18 and 19 through the Internet 17 in the example described above, the subject which obtains images may be an information terminal device other than the mobile terminal, such as a portable information terminal, for example. The source of image acquisition may be a server other than the WWW servers 18 and 19, such as a mail server, for example. The medium for transmitting images may be a network other than the Internet 17, such as a communication network or CATV network, for example.

As has been described above, this embodiment enables the operation of obtaining an image from a server, changing the size of the image, and utilizing the image as a background image.

When selecting one of a plurality of images in the image selecting process of step S112, the image selecting unit 409 in the example of the embodiment automatically selects the first image from among a plurality of images. Alternatively, the user may arbitrarily specify an image to be selected through the input unit 401. In this case, the image selecting unit 409 selects the image specified by the user.

In an application in which an image is selected from among a plurality of images in accordance with an instruction from a user, the device will be further provided with an image list box generating unit and the image selecting unit 409 will be equipped with a focusing function and a decision function, for example.

The image list box generating unit generates an image list box composed of a plurality of boxes each including an image or information (hereinafter referred to as image information) associated with the corresponding image and allowing the user to identify the image.

It is recommended that the storage locations of images ("moon. gif," "star. gif," etc.) should be used as the image information in the image list box. This is because the user can instantaneously understand the correspondence between the storage locations and images since they are associated with each other and the storage locations usually contain the name of images. Furthermore, the image storage locations can be easily obtained by analyzing the HTML documents because HTML documents have been obtained from the WWW servers 18 and 19 prior to the acquisition of images.

The image selecting unit 409 focuses on one of the plurality of boxes in the image list box and moves the focus up and down (and/or right and left) in response to key operation by the user. When the user enters a determination through key operation with a certain box being focused on, the image selecting unit 409 selects the image (or image information) in that box.

Second Embodiment

Figure 10:
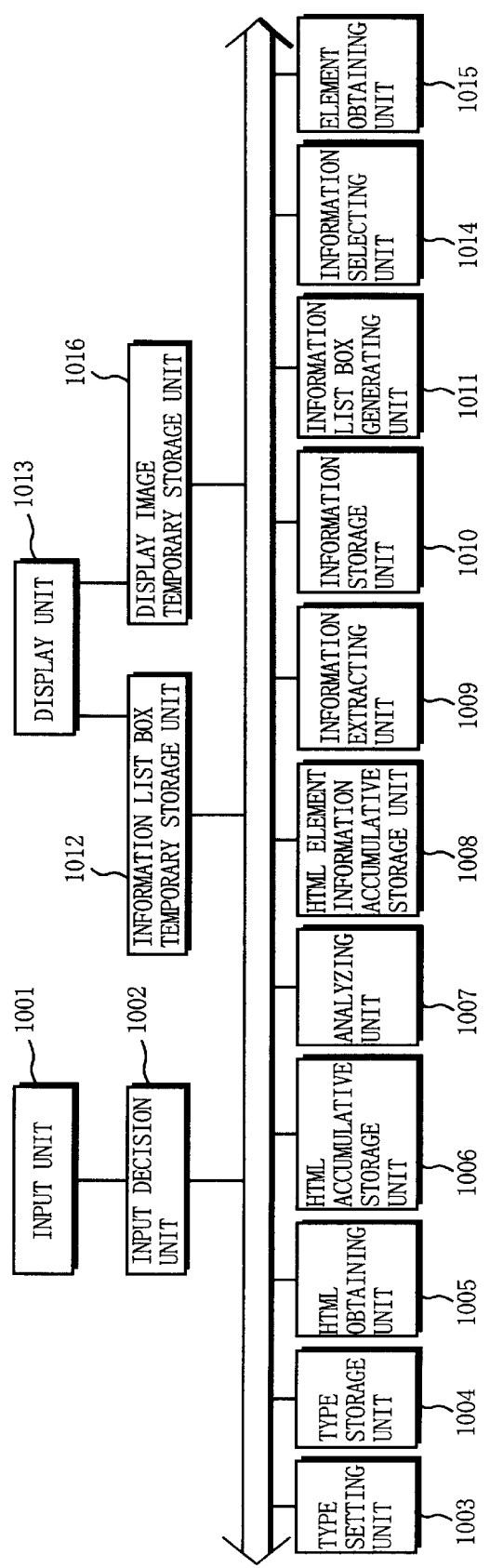
FIG. 10 is a block diagram showing the functional structure of a terminal according to a second embodiment of the invention.

FIG. 10 is a block diagram showing the functional structure of a terminal according to a second embodiment of the invention. The terminal shown in FIG. 10 corresponds to the terminals 10 and 11 shown in FIG. 1. Its hardware structure is shown in FIG. 2 and the software structure of the communication application unit 30 of FIG. 2 is shown in FIG. 3.

Figure 11:
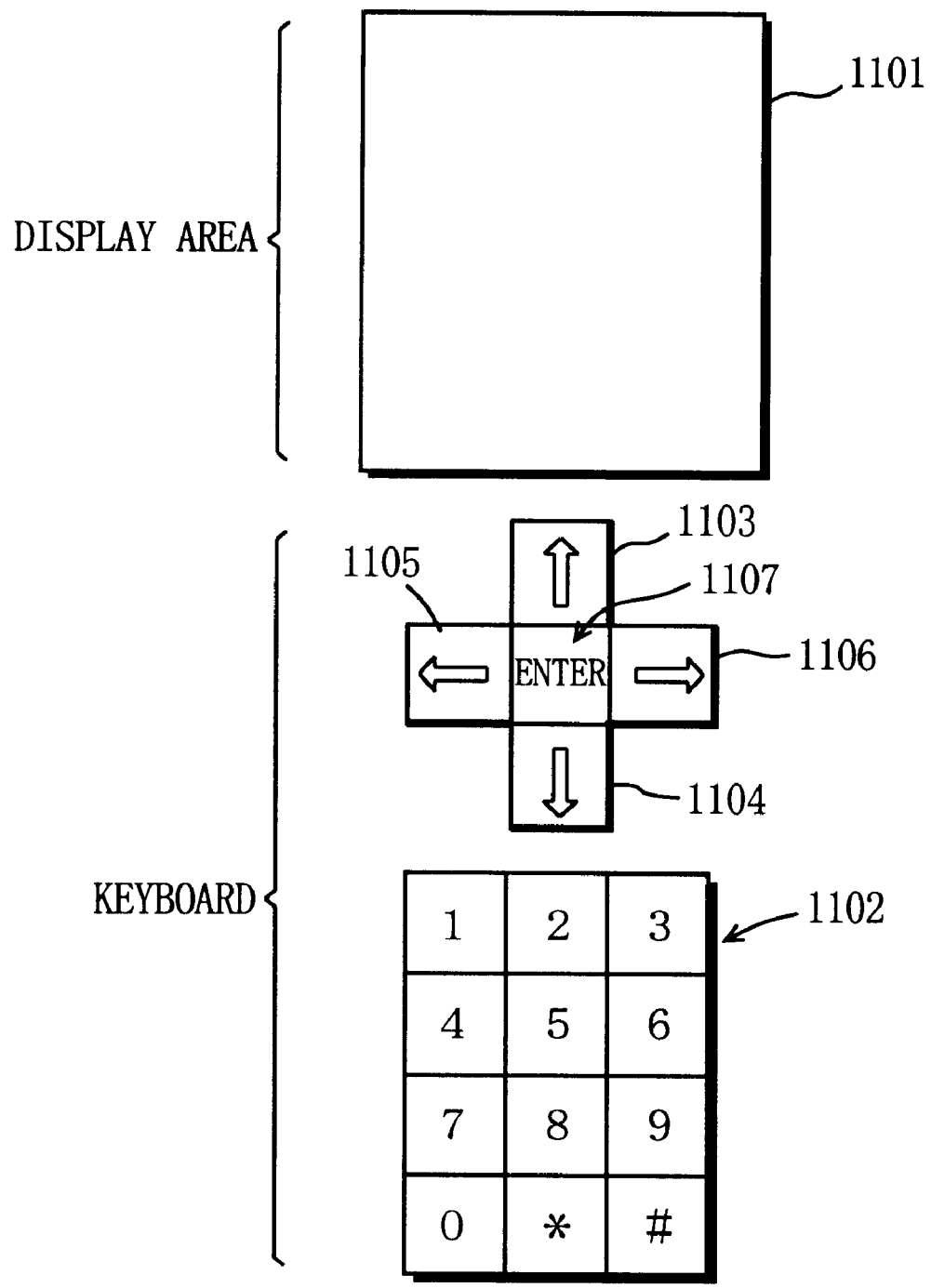
FIG. 11 is a schematic diagram showing an example of the structure of the display area 1101 in the screen of the display 1013 of FIG. 10 and the keyboard of the input unit 1001.

FIG. 11 is a schematic diagram showing an example of the structure of a display area 1101 on the screen in the display 1013 of FIG. 10 and that of the keyboard in the input unit 1001. In FIG. 11, the keyboard has a ten-key pad 1102 for entry of dial numbers and characters, an up key 1103, a down key 1104, a left key 1105, a right key 1106 and an enter key 1107 for selecting information. It is assumed here that information is selected by using the up key 1103, down key 1104 and enter key 1107.

In this embodiment, the program implemented in the browser application 105 in FIG. 3 is a program for selecting and using one of pieces of information contained in an HTML document obtained from the WWW server 18 or 19, which is typically an image select/display program for selecting one of the storage locations of plural pages of images and displaying the image. The CPU 31 operates in accordance with this image select/display program to realize the functions of the blocks shown in FIG. 10 (which are described below).

In FIG. 10, the terminal according to a second embodiment of the invention includes an input unit 1001, an input decision unit 1002, an type setting unit 1003, a type storage unit 1004, an HTML obtaining unit 1005, an HTML accumulative storage unit 1006, an analyzing unit 1007, an HTML element information accumulative storage unit 1008, an information extracting unit 1009, an information storage unit 1010, an information list box generating unit 1011, an information list box temporary storage unit 1012, a display 1013, an information selecting unit 1014, an element obtaining unit 1015, and a display image temporary storage unit 1016.

The input unit 1001 receives instruction input from a user. The input decision unit 1002 recognizes instructions received at the input unit 1001 (an instruction for setting the extracted element type, an instruction for obtaining an HTML document, an instruction for selecting information, etc.). The type setting unit 1003 sets the extracted element type ("image" here). The type storage unit 1004 stores the extracted element type set by the type setting unit 1003.

The HTML obtaining unit 1005 obtains HTML documents and images from the WWW servers 18 and 19 through the Internet 17. The HTML accumulative storage unit 1006 accumulatively stores the HTML documents and images obtained by the HTML obtaining unit 1005. The analyzing unit 1007 analyzes the HTML documents accumulatively stored in the HTML accumulative storage unit 1006. The HTML element information accumulative storage unit 1008 accumulatively stores HTML element information analyzed by the analyzing unit 1007.

The information extracting unit 1009 extracts information contained in elements belonging to the type (image) stored in the type storage unit 1004 (the storage locations of images) from the HTML element information accumulatively stored in the HTML element information accumulative storage unit 1008. The information storage unit 1010 stores the information extracted by the information extracting unit 1009. The information list box generating unit 1011 generates an information list box describing the information stored in the information storage unit 1010 (storage locations of a plurality of images) The information list box temporary storage unit 1012 temporarily stores the information list box generated by the information list box generating unit 1011.

The display 1013 displays the information list box temporarily stored in the information list box temporary storage unit 1012 and also displays an image temporarily stored in the display image temporary storage unit 1016 within the display area 1101. The information selecting unit 1014 selects one of the information pieces (storage locations of a plurality of images) stored in the information storage unit 1010. The element obtaining unit 1015 obtains the element (image) corresponding to the information selected by the information selecting unit 1014 from the HTML accumulative storage unit 1006 if it is present therein, or the element obtaining unit 1015 externally obtains the element if it is not therein (here, the element obtaining unit 1015 requests the HTML obtaining unit 1005 to obtain the element from the WWW server 18 or 19 through the Internet 17). The display image temporary storage unit 1016 temporarily stores the image obtained by the element obtaining unit 1015 as a display image.

Figure 12:
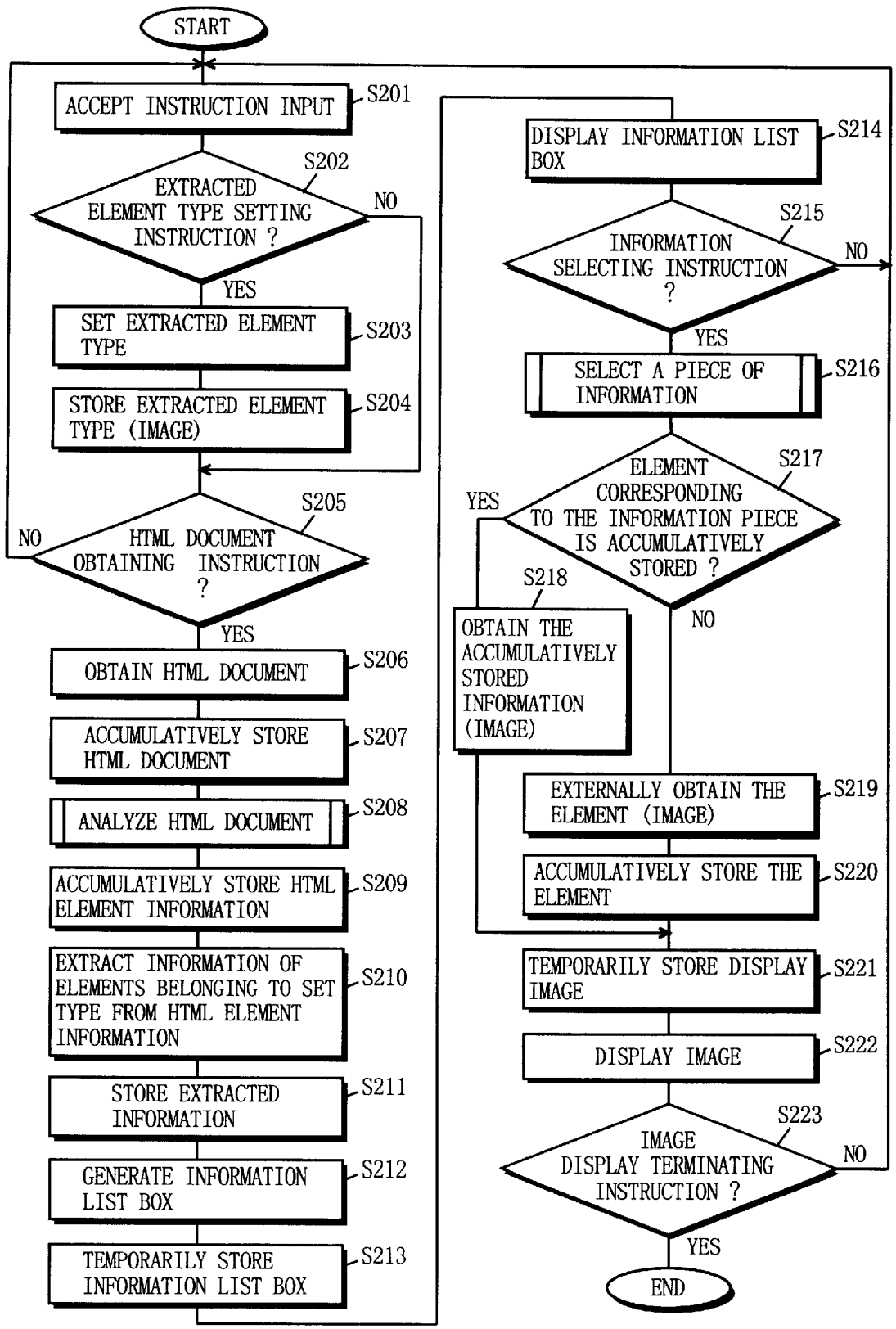
FIG. 12 is a flowchart showing a series of operation by the terminal shown in FIG. 10 from analyzing an HTML document for selecting and displaying an image as a background image.

FIG. 12 is a flowchart showing a series of operations in which the terminal shown in FIG. 10 analyzes an HTML document, extracts information showing storage locations of images from the analyzed results (i.e. HTML element information), generates and displays an information list box, selects one of the storage locations of the plurality of images in accordance with a selecting instruction from a user, obtains the image from the selected storage location, and displays it as the background image. The operation of the terminal of the second embodiment of the invention will now be described in detail referring to FIGS. 10 to 12.

In FIG. 12, when the power is turned on in this terminal, the input unit 1001 starts the operation of accepting instruction input from a user (step S201). Next the input decision unit 1002 decides whether the instruction received at the input unit 1001 is an instruction for setting the extracted element type (step S202). When the decision made in step S202 is NO, the step S205 follows.

When the decision made in step S202 is YES, the type setting unit 1003 sets the extracted element type (step S203) Next the type storage unit 1004 stores the extracted element type which was set in step S203 by the type setting unit 1003 (step S204).

Now the extracted element type setting process in the step S203 and the extracted element type storage process in step S204 will be described in greater detail. The type setting unit 1003 contains a plurality of extracted element types previously provided. It is assumed here that the three extracted element types "text," "link" and "image" are provided.

When the power is turned on in the terminal for the first time, the type setting unit 1003 initializes the extracted element type. In the initialization, the type setting unit 1003 sets "image" as the extracted element type and the type storage unit 1004 stores the set type "image."

When the user presents an extracted element type setting instruction, the type setting unit 1003 sets the extracted element type again. In the re-setting, the type setting unit 1003 sets the extracted element type indicated by the user (e.g. "link") and the type storage unit 1004 stores the set type "link."

It is assumed in the description below that the type storage unit 1004 stores "image" as the extracted element type in step S204.

Referring to FIG. 12 again, the input decision unit 1002 next determines whether the instruction received at the input unit 1001 is an HTML document obtaining instruction (step S205). When the decision made in step S205 is NO, the flow returns to step S201 and the input unit 1001 accepts the next instruction input.

When the decision made in step S205 is YES, the HTML obtaining unit 1005 obtains an HTML document from the WWW server 18 or 19 through the Internet 17 (step S206). Next the HTML accumulative storage unit 1006 accumulatively stores the HTML document obtained in step S206 by the HTML obtaining unit 1005 (step S207).

Next the analyzing unit 1007 analyzes the HTML document accumulatively stored in step S207 in the HTML accumulative storage unit (step S208). Next the HTML element information accumulative storage unit 1008 accumulatively stores the HTML element information analyzed in step S208 by the analyzing unit 1007 (step S209).

Now the HTML document analyzing process in the step S208 and the HTML element information accumulative storage process in the step S209 will be described in detail.

FIG. 13 is a diagram showing an example of an HTML document accumulatively stored in the HTML accumulative storage unit 1006 in the step S207 of FIG. 12. In FIG. 13, the HTML document is composed of seven lines, the first to seventh lines (1301 to 1307).

Figure 14:
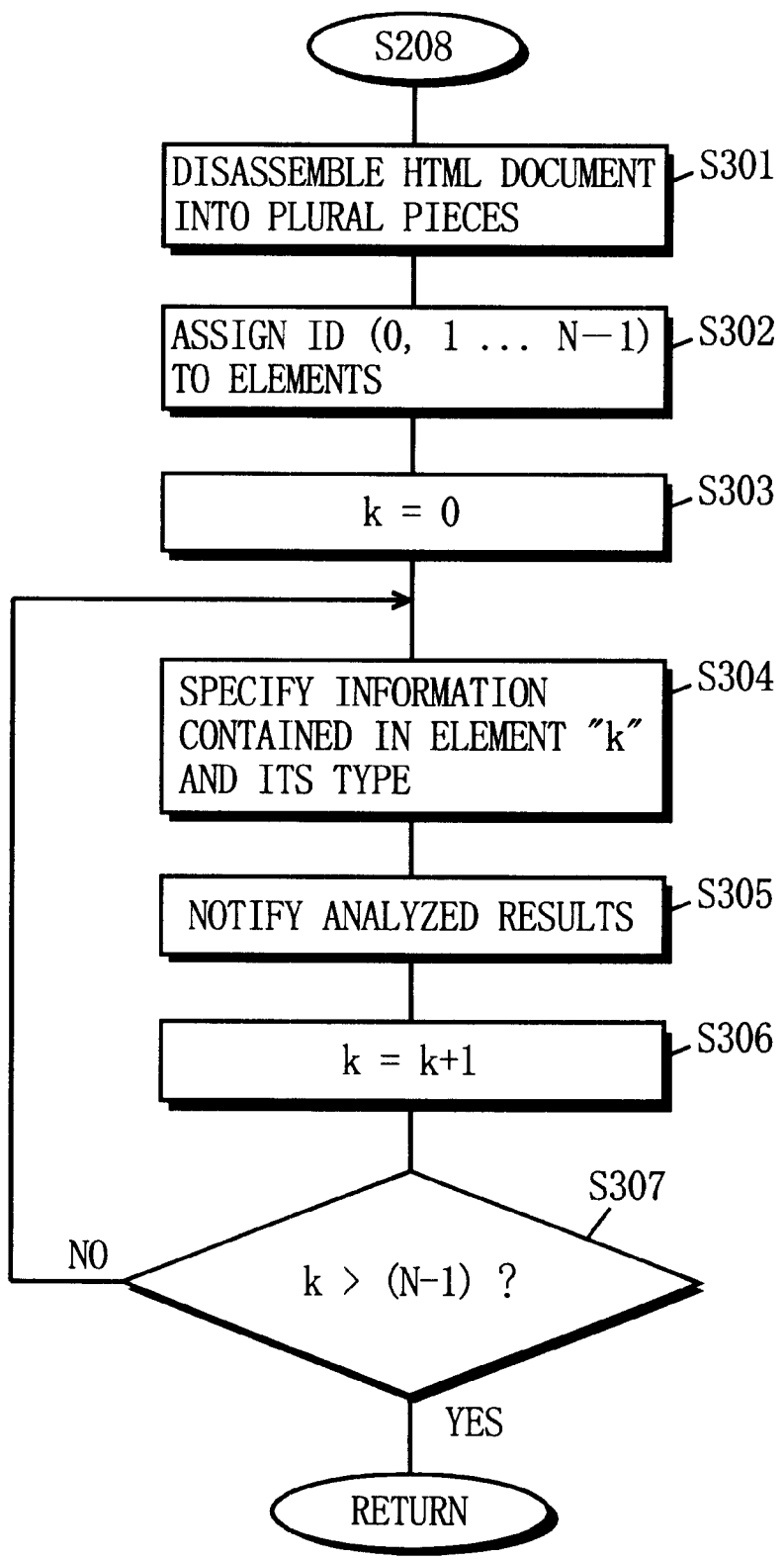
FIG. 14 is a flowchart showing the details of the HTML document analyzing processing in step S208 of FIG. 12.

FIG. 14 is a flowchart showing the details of the HTML document analyzing process in the step S208 of FIG. 12. Now the analysis of the HTML document performed by the analyzing unit 1007 will be described referring to FIGS. 13 and 14.

In FIG. 14, the analyzing unit 1007 first disassembles the HTML document accumulatively stored by the HTML accumulative storage unit 1006 in step S207 of FIG. 12 (step S301). Then the HTML document analyzing unit 1007 provides identifiers (IDs) to the individual elements (step S302). Sequential numbers starting from zero are used as the IDs here. Accordingly, when N elements are obtained in the disassembly of step S301, then IDs=0, 1, 2, . . . (N−1) are assigned to the elements.

Next, the analyzing unit 1007 sets the initial value (zero, here) in "k" indicating the identifier of the element to be analyzed (step S303). Next the analyzing unit 1007 decides whether the element "k" includes some piece of previously provided information and then specifies, on the basis of the decision, which of the previously provided element types the element "k" belongs to (step S304).

Next the analyzing unit 1007 notifies the HTML information accumulative storage unit 1006 of the analyzed results obtained in step S304, i.e. the element type of the element "k" and the information it contains (step S305).

Next the analyzing unit 1007 increments "k" (step S306) and then decides whether "k" is larger than "N−1" (step S307). When the decision made in step S307 is NO, the analyzing unit 1007 returns to step S304 and repeats the same processing, and ends the processing when a decision of YES is made.

The series of processes is now more specifically described in an example in which the HTML document shown in FIG. 13 is analyzed. In the steps S301 and S302, the analyzing unit 1007 divides the HTML document into lines and provides IDs 0 to 6 to the elements, regarding the information described in each of the lines 1301 to 1307 as one element in the HTML document. Then, in step S304, the analyzing unit 1007 decides the following factors about the elements provided with IDs 0 to 6 (i.e. about the first to seventh lines 1301 to 1307 in FIG. 13)

(I) whether it contains a character string;
(II) whether it contains a storage location;
(III) whether it contains a linked location. Then, on the basis of the decisions made on the factors (I) to (III), the analyzing unit 1007 specifies which of the previously provided three element types "text," "link" and "image" each element belongs to.

That is to say, the analyzing unit 1007 first decides that the element of ID=0 (the first line 1301) contains a character string but no storage location nor link information, and then specifies on the basis of the decision that its element type is "text." Next, the analyzing unit 1007 decides that the element of ID=1 (the second line 1302) contains a character string and link information but no storage location, and then specifies on the basis of the decision that its element type is "link." Next, the analyzing unit 1007 decides that the element of ID=2 (the third line 1303) contains a storage location but no character string nor link information, and then specifies on the basis of the decision that its element type is "image." The analyzing unit 1007 examines the elements of IDs 3 to 6 (the fourth to seventh lines 1304 to 1307) in the same way and specifies their element types on the basis of the decisions.

The HTML element information accumulative storage unit 1008 receives the results analyzed by the analyzing unit 1007 and accumulatively stores them as HTML element information.

FIG. 15 is a diagram showing an example of the HTML element information accumulatively stored in the HTML element information accumulative storage unit 1008 of FIG. 10 (the information obtained by analyzing the HTML document of FIG. 13). In FIG. 15, the HTML element information includes the type (here, "text," "link" or "image") of elements (ID=0 to 6) in the HTML document and the information contained in each element (here, character string, storage location and linked location).

The character string is information indicating the name of the element or the entire HTML document ("information about celestial objects," etc.), the storage location is information indicating the location in which the entity of that element is stored ("moon. gif" etc.), and the linked location is information indicating a location linked to that element ("moon. html" etc.)

Referring to FIG. 12 again, the information extracting unit 1009 next extracts the information contained in the elements which belong to the type ("image") stored in step S204 in the type storage unit 1004 from the HTML element information accumulatively stored in step S209 in the HTML element information accumulative storage unit 1008 (step S210).

Accordingly, extracted from the HTML element information shown in FIG. 15 are the information pieces contained in the elements belonging to "image" (the three elements provided with IDs 2, 4 and 6), i.e. the three storage locations of images, "moon. gif," "sun. gif" and "star. gif."

Next, the information storage unit 1010 stores the information extracted by the information extracting unit 1009 in step S210 (step S211). Next the information list box generating unit 1011 generates an information list box in which the information stored in step S211 in the information storage unit 1010 is described (step S212). This information list box is composed of the same number of boxes as the information pieces extracted by the information extracting unit 1009 in step S210.

Next, the information list box temporary storage unit 1012 temporarily stores the information list box generated by the information list box generating unit 1011 in step S212 (step S213). Next the display 1013 displays the information list box stored by the list temporary storage unit in step S213 (step S214).

Figure 16:
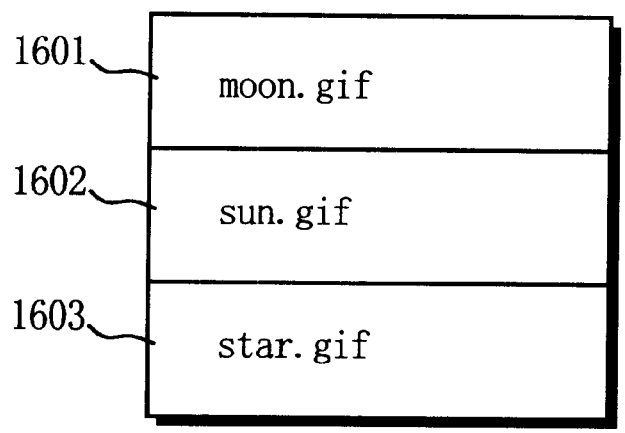
FIG. 16 is a diagram showing an example of the information list box that the display 1013 displays in step S214 (an example in which the storage locations of the entities of the images are described in characters).

FIG. 16 is a diagram showing an example of the information list box that the display 1013 displays in step S214.

In FIG. 16, the information list box contains three boxes 1601 to 1603 vertically arranged in a line. When the boxes are called the zeroth box, first box . . . in order from the uppermost box 1601, then the zeroth box 1601 contains "moon. gif," the first box 1602 contains "sun. gif" and the second box 1603 contains "star. gif."

Figure 17:
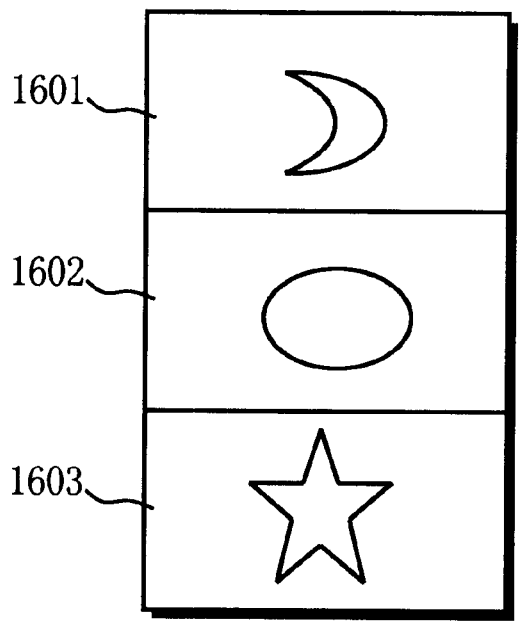
FIG. 17 is a diagram showing another example of the information list box that the display 1013 displays in step S214 (an example in which the images themselves are shown).

In the information list box shown in FIG. 16, the storage locations of the entities of the images are described in the character form as "moon. gif," "sun. gif" and "star. gif." Alternatively, they may be described as images of moon, sun and star as shown in FIG. 17 by obtaining the entities of the images from their storage locations.

Referring to FIG. 12 again, next, the input decision unit 1002 decides whether the instruction accepted at the input unit 1001 is an information selecting instruction (step S215). When the decision made in step S215 is NO, the flow returns to step S201 and the input unit 1001 accepts the next instruction input.

When the decision made in step S215 is YES, the information selecting unit 1014 selects one of the information pieces that the information storage unit 1010 stored in step S211 (step S216).

The information selecting processing in step S216 is now be described in detail.

Figure 18:
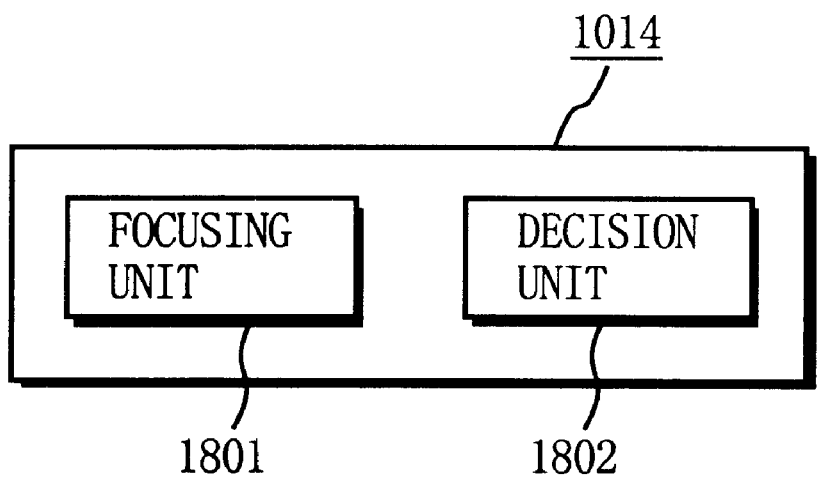
FIG. 18 is a block diagram showing the structure of the information selecting unit 1014 of FIG. 10.

FIG. 18 is a block diagram showing the structure of the information selecting unit 1014 of FIG. 10. In FIG. 18, the information selecting unit 1014 includes a focusing unit 1801 and a decision unit 1802.

Figure 19:
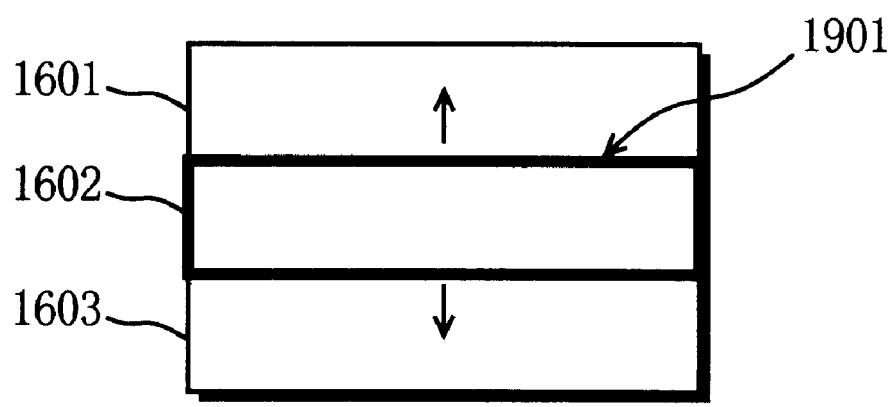
FIG. 19 is a diagram showing a focus applied to a box in the information list box (the window frame 1901 applied to the box 1602 corresponds to the focus).

The focusing unit 1801 focuses on a single box in the information list box displayed by the display 1013. "Focusing on a single box" means the processing of varying the displayed state of that box so that it can be visually distinguished from other boxes; it may be the processing of enhancing the outline of that box, or varying its brightness or color, for example. In the description below, as shown in FIG. 19, the window frame 1901 applied to the box 1602 in the information list box is referred to as focus 1901.

When the up and down keys 1103 and 1104 in the input unit 1001 are pressed with a certain box being focused on in the information list box displayed by the display 1013, then the focusing unit 1801 moves the focus to the upper or lower box accordingly. That is to say, in the information list box of FIG. 19, the focus 1911 applied to the box 1602 is moved to the upper adjacent box 1601 when the up key 1103 is pressed, and it is moved to the lower adjacent box 1603 when the down key 1104 is pressed.

When the enter key 1107 is pressed with the focusing unit 1802 focusing on a certain box in the information list box displayed by the display 1013 (see FIG. 19), then the setting unit 1802 sets the information described in that box as information selected by the information selecting unit 1014.

Figure 20:
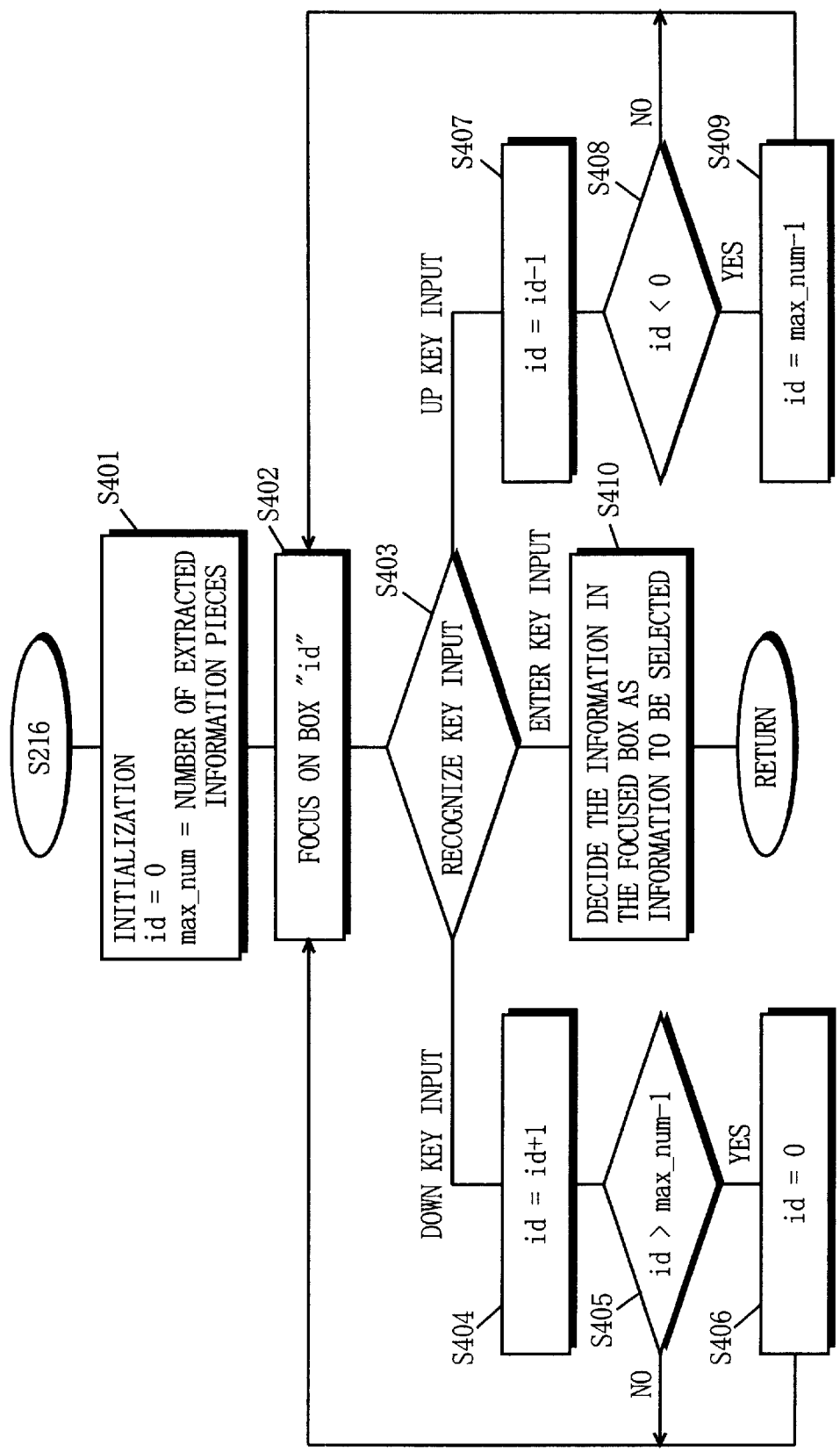
FIG. 20 is a flowchart showing the details of the selecting processing in step S216 of FIG. 12.

FIG. 20 is a flowchart showing the details of the selecting processing performed in step S216 of FIG. 12. The character "max_num" shown in FIG. 20 indicates the number of information pieces extracted by the information extracting unit 1009 in step S210 of FIG. 12. The character "id" indicates the box presently focused on by the focusing unit 1801 among the plurality of boxes forming the information list box displayed in step S214 by the display 1013 (the three, zeroth to second, boxes 1601 to 1603 here).

In FIG. 20, first, the focusing unit 1801 performs initialization (step S401). In this initialization, the initial value (0, here) is set in "id" and the number of extracted information pieces (3, here) is set in "max_num."

Next the focusing unit 1801 focuses on the "id"th box in the information list box displayed by the display 1013 (see FIG. 19:step S402). That is to say, the 0th (i.e. the uppermost) box 1601 is focused on at the beginning of the selecting processing.

Next the input decision unit 1002 decides which of the up key 1103, down key 1104 and enter key 1107 was pressed and notifies the focusing unit 1801 and the setting unit 1802 (step S403) of the decision.

When the down key 1104 is pressed, the focusing unit 1801 performs the following processing. First, it increments "id" (step S404) and next decides whether "id" is larger than "max_num–1" (step S405). When the decision made in step S405 is NO, the focusing unit 1801 goes back to step S402 and focuses on the "id"th box.

When the decision made in step S405 is YES, the focusing unit 1801 sets "id" back to the initial value (O here: step S406) and returns to step S402.

That is to say, when the down key 1104 is pressed, the focus applied to a certain box is moved to the lower adjacent box (for example, the focus applied to the first box 1602 is moved to the second box 1603). However, when the down key 1104 is pressed with the focus being applied to the lowermost box (the second box 1603 here), then the focus is jumped to the uppermost box (the 0th box 1601 here).

When the up key 1103 is pressed, the focusing unit 1801 performs the following processing. First it decrements "id" (step S407) and then decides whether "id" is smaller than zero (step S408). When the decision made in step S408 is NO, the focusing unit 1801 goes back to step S402 and focuses on the "id"th box.

When the decision made in step S408 is YES, the focusing unit 1801 sets "max_num–1" in "id" (step S409) and goes back to step S402.

That is to say, when the up key 1103 is pressed, the focus applied to a certain box is moved to the upper adjacent box (for example, the focus applied to the first box 1602 is moved to the 0th box 1601). However, when the up key 1103 is pressed with the focus applied to the uppermost box (the 0th box 1601 here), then the focus is jumped to the lowermost box (the second box 1603 here).

When the enter key 1107 is pressed, the setting unit 1802 sets the information described in the box being focused on by the focusing unit 1801 as the information selected by the information selecting unit 1014 (step S410) and the information selecting processing is ended.

Referring to FIG. 12 again, next, the element obtaining unit 1015 determines whether the element (image) corresponding to the information (storage location) that the information selecting unit 1014 selected in step S216 is present in the HTML accumulative storage unit 1006 (step S217). When the decision made in step S217 is YES, the element obtaining unit 1015 obtains that element from the HTML accumulative storage unit 1006 (step S218) and then the step S221 is performed.

When the decision made in step S217 is NO, the element obtaining unit 1015 obtains that element from outside of this terminal: herein, it requests the HTML obtaining unit 1005 to obtain that element from the WWW server 18 or 19 through the Internet 17 (step S219) and the HTML accumulative storage unit 1006 accumulatively stores that element (step S220). Then the step S221 is performed.

In the description below, it is assumed that the element obtaining unit 1015 has obtained in step S219 the image stored in the location "moon. gif" (the element provided with ID=2 in FIG. 15) from the WWW server 18 or 19 through the Internet 17.

Next, the display image temporary storage unit 1016 temporarily stores the image obtained by the element obtaining unit 1015 in step S219 as the display image (step S221)

and then the display 1013 displays the image stored in the display image temporary storage unit 1016 in the display area 1101 as the background image (step S222).

Next, the input decision unit 1002 decides whether the instruction accepted at the input unit 1001 is an image display terminating instruction (step S223). When the decision made in step S223 is YES, the display 1013 terminates the image display, and when it is NO, the steps S201 to S223 are performed again.

The terminal operates as described above.

While the description above has shown an example in which "image" is set as the extracted element type, the terminal operates as shown below when "link" is set, for example.

The terminal extracts the linked location "moon. html," "sun. html" and "star. html" contained in the elements belonging to the "link" (i.e. the elements having ID=1, 3 and 5) from the HTML document of FIG. 15 and displays an information list box describing the three linked locations. Then, when the user specifies any linked location, the terminal selects that linked location as described above. Then the terminal accesses to that linked location, for example.

In the description above, the information list box is composed of a plurality of boxes (1601 to 1603) vertically arranged in a line and the focusing unit 1801 moves the focus up and down as the up and down keys 1103 and 1104 are pressed. However, the information list box may be composed of a plurality of boxes which are two-dimensionally arranged. In this case, the focusing unit 1801 moves the focus up, down, right and left as the up, down, right and left keys 1103 to 1106 are pressed.

Further, while the terminal obtains images from the WWW servers 18 and 19 through the Internet 17 in the description above, the subject which obtains images can be an information terminal device other than a terminal, and the source of the images can be a server other than the WWW servers 18 and 19, and the medium transmitting the images can be a network other than the Internet 17, as already stated in the first embodiment.

As has been described so far, this embodiment enables the processing of accumulatively storing images obtained from a server and selecting and displaying an image that the user desires from among the accumulated images.

While the invention has been described in detail, the foregoing description is in all aspects illustrative and not restrictive. It is understood that numerous other modifications and variations can be devised without departing from the scope of the invention.

What is claimed is:

1. An information terminal device operable to display a changeable background screen, said device comprising:

an obtaining unit operable to obtain, from a server, a plurality of images and a document containing storage locations of the plurality of images, each of the plurality of images being selectable as the background screen;

an extracting unit operable to extract the storage locations from the obtained document;

an image storing unit operable to store the obtained plurality of images at the extracted storage locations;

a storage location storing unit operable to store the extracted storage locations;

a selecting unit operable to select one of the storage locations stored in said storage location storing unit in response to a user instruction, and an image displaying unit operable to read, from said image storing unit, an image stored at the selected storage location and to display the read image as the background screen, wherein, until receiving the user instruction, said selecting unit selects the first storage location extracted by said extracting unit.

2. The information terminal device according to claim 1, further comprising:

a list generating unit operable to generate a list containing the storage locations stored in said storage location storing unit; and a list displaying unit operable to display the generated list, wherein said selecting unit is further operable to select one of the storage locations contained in the displayed list in response to the user instruction, and wherein, if no image is stored in said image storing unit at the storage location selected by said selecting unit, said image displaying unit instructs said obtaining unit to obtain an image from the server.

3. A method for changing a background screen displayed on an information terminal device, said method comprising:

obtaining, from a server, a plurality of images and a document containing storage locations of the plurality of images, each of the plurality of images being selectable as the background screen;

extracting the storage locations from the obtained document;

storing the obtained plurality of images into an image storing unit at the extracted storage locations;

storing the extracted storage locations;

selecting one of the stored storage locations in response to a user instruction; and reading, from the image storing unit, an image stored at the selected storage location and displaying the read image as the background screen, wherein, until receiving the user instruction, said selecting comprises selecting the first extracted storage location.

4. The method according to claim 3, further comprising:

generating a list containing the stored storage locations; and displaying the generated list, wherein said selecting comprises selecting one of the storage locations contained in the displayed list in response to the user instruction, and wherein said reading comprises obtaining an image from the server if no image is stored in the image storing unit at the selected storage location.

* * * * *

UNITED STATES PATENT AND TRADEMARK OFFICE
CERTIFICATE OF CORRECTION

PATENT NO. : 6,674,439 B1
DATED : January 6, 2004
INVENTOR(S) : Hidehiko Shin et al.

It is certified that error appears in the above-identified patent and that said Letters Patent is hereby corrected as shown below:

<u>Title page,</u>
Item [56], References Cited, OTHER PUBLICATIONS, please delete reference "Shimada T. et al." and reference "Kiyoto Tanaka et al.," in their entirety Signed and Sealed this Eighteenth Day of May, 2004

JON W. DUDAS
*Acting Director of the United States Patent and Trademark Office*